US008034976B2

(12) United States Patent
Hinago et al.

(10) Patent No.: US 8,034,976 B2
(45) Date of Patent: Oct. 11, 2011

(54) NITROGEN-CONTAINING CARBON MATERIAL AND METHOD OF PRODUCING THE SAME

(75) Inventors: Hidenori Hinago, Tokyo (JP); Hajime Nagahara, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 389 days.

(21) Appl. No.: 11/992,423

(22) PCT Filed: Sep. 22, 2006

(86) PCT No.: PCT/JP2006/318842
§ 371 (c)(1),
(2), (4) Date: Mar. 21, 2008

(87) PCT Pub. No.: WO2007/043311
PCT Pub. Date: Apr. 19, 2007

(65) Prior Publication Data
US 2009/0112020 A1 Apr. 30, 2009

(30) Foreign Application Priority Data
Sep. 30, 2005 (JP) ................................. 2005-287773

(51) Int. Cl.
*C07C 211/00* (2006.01)
*H01M 4/02* (2006.01)
*C01B 31/02* (2006.01)

(52) U.S. Cl. ......... 564/1; 429/212; 429/213; 429/218.1; 423/364; 423/365

(58) Field of Classification Search ...... 564/1; 429/212, 429/213, 218.1; 423/364, 365
See application file for complete search history.

(56) References Cited

U.S. PATENT DOCUMENTS

| 5,679,480 A | 10/1997 | Takahashi et al. |
| 5,766,445 A | 6/1998 | Hashizume et al. |

FOREIGN PATENT DOCUMENTS

| JP | 7-37577 A | 2/1995 |
| JP | 7-90588 A | 4/1995 |
| JP | 8-165111 A | 6/1996 |
| JP | 8-180866 A | 7/1996 |
| JP | 9-27317 A | 1/1997 |
| JP | 10-21918 A | 1/1998 |
| JP | 2000-1306 A | 1/2000 |
| JP | 2001-80914 A | 3/2001 |
| JP | 2003-137524 A | 5/2003 |
| JP | 2003-277026 A | 10/2003 |
| JP | 2004-168587 A | 6/2004 |
| JP | 2004-342463 A | 12/2004 |
| JP | 2004-362802 A | 12/2004 |
| JP | 2005-798 A | 1/2005 |
| JP | 2005-89264 A | 4/2005 |
| JP | 2005-239456 A | 9/2005 |
| JP | 2006-124250 A | 5/2006 |

OTHER PUBLICATIONS

Sato et al., "Large Scale Rechargeable Batteries for Vehicles", CMC Publishing Co., Ltd.; Dec. 24, 2003.
Koji Hatai., "Carbon Materials for Negative Electrodes for Lithium Ion Secondary Batteries", Realize Science & Engineering Center Co., Ltd. ; Oct. 20, 1996, pp. 4 & 11.
Maya, L. et al., "Carbon-Nitrogen Pyrolyzates: Attempted Preparation of Carbon Nitride," Journal of the American Ceramic Society, vol. 74, No. 7, pp. 1686-1688, 1991.
Office Action issued Feb. 22, 2010, in related Korean Patent Application No. 520030402863.
Office Action issued Jul. 14, 2010, in Chinese Patent Application No. 200680035969.6 (translation provided).
Li Chao et al., "Crystalline Carbon Nitride Deposited by Glow Discharge in Liquid Phase," Chemical Journal of Chinese Universities, vol. 25, No. 1, Jan. 31, 2004, pp. 21-23 (partial translation provided).
Office Action issued Aug. 17, 2010, in corresponding Korean Patent Application No. 2008-7007523.
English translation of Office Action dated Aug. 17, 2010, issued in Korean Patent Application No. 10-2008-7007523.
Office Action issued Jun. 8, 2011, in corresponding Korean Patent Application No. 10-2010-7023154.

*Primary Examiner* — Peter G O'Sullivan
(74) *Attorney, Agent, or Firm* — Birch, Stewart, Kolasch & Birch, LLP

(57) ABSTRACT

The present invention provides a nitrogen-containing carbon material characterized in that it satisfies a specific relational expression between the number ratio of nitrogen atoms to carbon atoms and the number ratio of hydrogen atoms to carbon atoms and has peaks in specific regions in the X-ray diffraction and in the laser Raman spectrum. The nitrogen-containing carbon material of the present invention can be produced by carbonizing azulmic acid in an inert gas atmosphere, and it is useful as an electrode material or the like because it has a high nitrogen content and a low hydrogen content.

31 Claims, 8 Drawing Sheets

NITROGEN-CONTAINING CARBON MATERIAL AND METHOD OF PRODUCING THE SAME

TECHNICAL FIELD

The present invention relates to a nitrogen-containing carbon material useful for electrode materials and the like, and to a method of producing the same.

BACKGROUND ART

Carbon materials, which have been used mainly for adsorbents and the like, are being investigated for wide applications because they have basic properties such as physical properties for electronic materials such as conductivity, high thermal conductivity, a low coefficient of thermal expansion, lightness, and heat resistance. In recent years, their physical properties for electronic materials have received attention, and they are thus used in or investigated particularly for electronic material fields such as lithium ion secondary battery negative electrodes and capacitor electrodes.

Such carbon materials are produced by using coconut husks, coal coke, coal or petroleum pitch, furan resins, phenol resins or the like as a raw material and subjecting the raw material to carbonization.

In recent years, there have been attempts to develop carbon materials by allowing such carbon materials to contain other elements to further extend the range of the physical properties of the carbon materials. Under these circumstances, nitrogen-containing carbon materials have recently received attention because of reports that they provide improved electrochemical characteristics in applications such as lithium ion secondary battery negative electrodes and capacitor electrodes and electrodes for electrolysis (refer, for example, to Patent Documents 1 and 2) and reports on the characteristics thereof as adsorbents (refer, for example, to Patent Document 3) and as hydrogen-occluding materials (refer, for example, to Patent Documents 4 and 5).

Conventionally known methods of producing nitrogen-containing carbon materials and such nitrogen-containing carbon materials are listed below.

As the methods of producing nitrogen-containing carbon materials, there are mainly known (1) a method of subjecting a low molecular nitrogen-containing organic compound as a raw material to chemical vapor deposition (CVD); (2) a method of polymerizing a low molecular nitrogen-containing organic compound as a raw material and then subjecting the resulting resin to carbonization; and the like.

In the above-described (1), there are known, for example, a method of depositing a nitrogen-containing organic compound such as pyrrole on a substrate (refer to Patent Documents 6 and 7); a method of depositing a nitrogen-containing organic compound in the pores of a porous body (refer to Patent Document 3); a method of depositing an acyclic organic compound such as acetonitrile on a carbon material (refer to Patent Documents 8 and 5); a method of polymerizing 2,3,6,7-tetracyano-1,4,5,8-tetraazanaphthalene and carbonizing the resulting polymer at a high temperature (refer to Patent Document 9); and the like.

In the above-described (2), there are known, for example, a method of carbonizing a melamine resin, a urea resin, an aniline resin at a high temperature (refer to Patent Document 10); a method of carbonizing a polyimide at a high temperature (refer to Patent Document 1); a method of carbonizing a polyaniline at a high temperature (refer to Patent Document 2); a method of carbonizing a polypyrrole at a high temperature (refer to Patent Document 11); a method of mixing phthalocyanine with a precursor of a furan resin and then carbonizing the resulting mixture at a high temperature (refer to Patent Document 12); a method of carbonizing polyacrylonitrile at a high temperature (refer, for example, to Patent Document 13); and the like.

However, neither the method (1) nor the method (2) is an economical production. In addition, they are not a satisfactory method of producing a material having a high nitrogen content and a low hydrogen content.

That is, the method (1) is not preferred because a process using CVD itself is not suitable for industrial mass-production, and because when a halogen-containing compound such as chlorine is used in a CVD process there is a problem of corrosion of materials.

In the method (2), an expensive resin such as a resin whose monomer used as a raw material is produced by a complicated production process such as multistage reaction or a resin which is not industrially mass-produced is used as a raw material to produce a carbonized product. Therefore, considering processes starting from a basic raw material, there is a problem of consuming an enormous amount of raw materials and energy until a carbon material is produced. Further, since a polymerization process and a process of forming resins or fibers are complicated, a nitrogen-containing carbon material obtained by carbonization consumes an increasingly greater amount of raw materials and energy. This increases the cost of nitrogen-containing carbon materials, making it unsatisfactory for them to be supplied to various applications. Furthermore, there have been problems such as a problem that the yield of a carbonized product at carbonization is low; a problem that the nitrogen content in the obtained nitrogen-containing carbon material is low; or a problem that when carbonization temperature is lowered or carbonization time is shortened in order to increase the nitrogen content, the progress of carbonization is suppressed to increase hydrogen content, leading to insufficient formation of a conjugated structure, which prevents development of characteristics as a carbon material in the first place. In addition, use of halogen such as chlorine or application of high pressure in the carbonization process is industrially disadvantageous in terms of materials and operation.

Characteristics as a substance of nitrogen-containing carbon materials having been produced by the above-described methods will be summarized below as follows.

A nitrogen-containing carbon material obtained by CVD generally has a low nitrogen content and a high hydrogen content, contains a residual nitrile group or a residual halogen group, and tends to have a shorter interlayer spacing of a layered structure. For example, in Patent Documents 6, 9, and 5, a nitrogen-containing carbon material is produced by CVD using pyrrole, 2,3,6,7-tetracyano-1,4,5,8-tetraazanaphthalene, acetonitrile, or cyanogen bromide as a raw material. However, it has a low nitrogen content or a high hydrogen content, contains a residual nitrile group or a residual halogen group, or has a short interlayer spacing. That is, in the X-ray diffraction pattern thereof, the peak location of the angle of diffraction (2θ) corresponding to the (002) plane is 26.50 (corresponding to a interlayer spacing of 3.36 angstroms).

Patent Document 11 discloses an example of producing a nitrogen-containing carbon material obtained by a method in which pyrrole is polymerized and the resulting polymer is carbonized at a high temperature. In the X-ray diffraction pattern of the resulting nitrogen-containing carbon material, the peak location of the angle of diffraction (2θ) corresponding to the (002) plane is 26.0°, which corresponds to a interlayer spacing of 3.42 angstroms. Patent Document 11 also discloses the laser Raman spectrum of the nitrogen-containing carbon material, wherein the peaks are located at 1,600 cm$^{-1}$ corresponding to crystallinity and 1,350 cm$^{-1}$ corresponding to amorphousness, showing substantially no peak shift. The 1,600 cm$^{-1}$ and 1,350 cm$^{-1}$ peaks are clearly separated, indicating that the Raman peaks each have a narrow half-width.

The above-described Patent Document 4 discloses a nitrogen-containing carbon material produced by CVD from N-vinyl-2-pyrrolidone. The laser Raman spectrum data of the resulting nitrogen-containing carbon material shows that the nitrogen-containing carbon material has a peak at 1,350 cm$^{-1}$ with a sharp half-width of 97 cm$^{-1}$. Patent Document 4 also discloses an example in which a nitrogen-containing carbon material is produced by pulverizing graphite powder at a very high acceleration of pulverization under a high-pressure nitrogen atmosphere. However, the 1,350 cm$^{-1}$ peak has a relatively sharp half-width of 87 cm$^{-1}$ at the most.

The half-width or the broadness of a peak of the laser Raman spectrum is an index showing crystallinity, and it is well known that the peak becomes sharper as the crystallinity increases (for example, Non-Patent Document 1).

That is, the nitrogen-containing carbon materials obtained by conventional techniques are those having at least one of the following four characteristics: (i) having a low nitrogen content, having a high hydrogen content, and/or containing a nitrile group and a halogen group; (ii) having a short interlayer spacing of the (002) plane as measured by X-ray diffraction; (iii) having a peak of the spectrum measured by laser Raman spectroscopy which is not shifted; and (iv) having a peak with a small half-width, showing high crystallinity.

It is known that carbon materials having a higher nitrogen atom content are more advantageous as a carbon material used in electronic material applications such as lithium ion secondary batteries and capacitors (for example, Patent Documents 7 and 14). In addition, a lower hydrogen content is more advantageous to electronic physical properties such as electron conductivity because the lower the hydrogen content, the more the conjugated structure develops. Preferably, a functional group is not present.

It is known that a carbon material having a low crystallinity is known as a non-graphitizable carbon (also referred to as a hard carbon), which is advantageous to the improvement of capacitance (for example, Non-Patent Document 2). It is also known that the low crystallinity makes it possible to use propylene carbonate which is excellent in low temperature operating characteristics as a solvent for an electrolyte (for example, Non-Patent Document 3).

Moreover, a large interlayer spacing is advantageous to the formation of an intercalation compound. In the case of a lithium ion secondary battery, it is advantageous to the insertion of lithium ions into and elimination from between the layers.

Therefore, a new carbon material having none of the above characteristics (i) to (iv) has been desired.
Patent Document 1: JP-A-2001-80914
Patent Document 2: JP-A-10-21918
Patent Document 3: JP-A-2004-168587
Patent Document 4: JP-A-2005-798
Patent Document 5: JP-A-2003-277026
Patent Document 6: JP-A-7-90588
Patent Document 7: JP-A-9-27317
Patent Document 8: JP-A-2004-342463
Patent Document 9: JP-A-2003-137524
Patent Document 10: JP-A-2000-1306
Patent Document 11: JP-A-8-165111
Patent Document 12: JP-A-2004-362802
Patent Document 13: JP-A-8-180866
Patent Document 14: JP-A-2005-239456
Non-Patent Document 1: Large-capacity secondary battery for automobiles, p. 140, CMC Publishing (2003)
Non-Patent Document 2: Carbon material for negative electrode lithium ion secondary battery, P. 4, Realize Co. (1996)
Non-Patent Document 3: Carbon material for negative electrode for lithium ion secondary battery, P. 11, Realize Co. (1996)

In view of the above circumstances, it is an object of the present invention to provide an energy-saving, resource-saving method of producing a nitrogen-containing carbon material characterized by utilization of a monomer directly derived from a basic chemical raw material such as natural gas or a fraction from a naphtha cracker or produced as a by-product thereof, simplicity of the polymerization step and the polymer pulverization step which is a step after polymerization, and a high carbonized-product yield in the step of carbonizing the obtained pulverized polymer.

It is another object of the present invention to provide a method of producing a nitrogen-containing carbon material which is industrially simple and allows mass production.

It is a further object of the present invention to provide a new nitrogen-containing carbon material having a high nitrogen atom content, a low hydrogen atom content, a low residual ratio of a nitrile group and a halogen group, a layered structure, a long interlayer spacing, and a specific peak shift in the laser Raman spectrum.

DISCLOSURE OF THE INVENTION

As a result of intensive study to solve the above problems, the present inventors have found a method of producing a nitrogen-containing carbon material and a nitrogen-containing carbon material and thus have attained the present invention.

Specifically, the present invention comprises the followings:
(1) A nitrogen-containing carbon material, characterized in that the material is produced by carbonizing azulmic acid in an inert gas atmosphere;
(2) A method of producing a nitrogen-containing carbon material, characterized in that the material is produced by carbonizing azulmic acid in an inert gas atmosphere;
(3) A nitrogen-containing carbon material, characterized in that the material satisfies the following conditions (i), (ii), and (iii):
(i) the material having a number ratio of nitrogen atoms to carbon atoms (N/C) and a number ratio of hydrogen atoms to carbon atoms (H/C) which satisfies the following relational expression (I):

$$(N/C) > 0.87 \times (H/C) - 0.06 \quad (I),$$

(ii) in an X-ray diffraction pattern obtained by using CuKα ray as X-ray source, the material having a peak located at an angle of diffraction (2θ) of 23.5 to 25.50, and
(iii) in a laser Raman spectrum in a range of wavenumber from 1,000 to 2,000 cm$^{-1}$, the material having at least two main peaks, a peak P1 between 1,355 and 1,385 cm$^{-1}$ and a peak P2 between 1,550 and 1,620 cm$^{-1}$, wherein a height L at a minimum point M between P1 and P2 from the base line and a height H1 at P1 from the base line have a ratio (L/H1) is 0.7 to 0.95;
(4) The nitrogen-containing carbon material according to (3), characterized in that the material has peaks at 401.0±0.3 eV and 398.0±0.5 eV in an XPS spectrum of N1s as measured by X-ray photoelectron spectroscopy (XPS);

(5) The nitrogen-containing carbon material according to (3) or (4), characterized in that, in the laser Raman spectrum in a range of wavenumber from 1,000 to 2,000 $cm^{-1}$, the peak P1 has a half-width of 200 to 400 $cm^{-1}$;

(6) The nitrogen-containing carbon material according to any of (3) to (5), characterized in that, in the laser Raman spectrum in a range of wavenumber from 1,000 to 2,000 $cm^{-1}$, the peak P2 has a half-width of 30 to 200 $cm^{-1}$;

(7) The nitrogen-containing carbon material according to any of (3) to (6), characterized in that the number ratio of hydrogen atoms to carbon atoms (H/C) is 0.01 to 0.5;

(8) The nitrogen-containing carbon material according to any of (3) to (7), characterized in that, in an infrared absorption spectrum, the maximum of peak intensities of absorbance in a wavenumber range of 1,500 to 1,800 $cm^{-1}$ has a wavenumber located from 1,550 to 1,640 $cm^{-1}$.

(9) The nitrogen-containing carbon material according to any of (3) to (8), characterized in that, in the infrared absorption spectrum, an intensity Q2 at a peak S2 of absorbance at a wavenumber of 2,200 to 2,280 $cm^{-1}$ and an intensity Q1 at a peak S1 of absorbance at a wavenumber of 1,550 to 1,640 $cm^{-1}$ have a ratio (Q2/Q1) of 0.07 or less;

(10) The nitrogen-containing carbon material according to any of (3) to (9), characterized in that, in the infrared absorption spectrum, an intensity Q3 at a peak S3 of absorbance at a wavenumber of 2,800 to 3,000 $cm^{-1}$ and the intensity Q1 at the peak S1 of absorbance at a wavenumber of 1,550 to 1,640 $cm^{-1}$ have a ratio (Q3/Q1) of 0.10 or less;

(11) The nitrogen-containing carbon material according to any of (3) to (10), characterized in that, in the infrared absorption spectrum, an intensity Q4 at a peak S4 of absorbance at a wavenumber of 3,000 to 3,500 $cm^{-1}$ and the intensity Q1 at the peak S1 of absorbance at a wavenumber of 1,550 to 1,640 $cm^{-1}$ have a ratio (Q4/Q1) of 0.80 or less;

(12) The nitrogen-containing carbon material according to (1), characterized in that the material satisfies at least one of (3) to (11); and

(13) The nitrogen-containing carbon material for electrode materials according to any of (1) and (3) to (12).

The production method of the present invention is a resource-saving, energy-saving production method because it uses as a raw material for polymers hydrogen cyanide or the like which is produced as a by-product and is not utilized in a process of producing a monomer such as acrylonitrile. The production method of the present invention is also an efficient production method because a polymer which is a precursor can be simply produced since a raw material is easily polymerized into a polymer, and the yield of a carbonized-product in the polymer-carbonizing process is high. Since the resulting nitrogen-containing carbon material is a non-sticky powder, it does not require forming processes such as a process of forming resins or fibers and a subsequent pulverization process and is also excellent in handling properties.

The nitrogen-containing carbon material of the present invention is a new nitrogen-containing carbon material having a high nitrogen atom content, a low hydrogen atom content, a low residual ratio of a nitrile group, a layered structure, and a long interlayer spacing, and having a specific peak shift and a broad peak which is considered to indicate an index of crystallinity in the laser Raman spectrum.

BEST MODE FOR CARRYING OUT THE INVENTION

The present invention provides a nitrogen-containing carbon material characterized in that the material is produced by carbonizing azulmic acid in an inert gas atmosphere.

The present invention further provides a method of producing a nitrogen-containing carbon material characterized in that the material is produced by carbonizing azulmic acid in an inert gas atmosphere.

The present invention further provides a nitrogen-containing carbon material, characterized in that the material satisfies the following conditions (1), (2), and (3):

(1) the material having a number ratio of nitrogen atoms to carbon atoms (N/C) and a number ratio of hydrogen atoms to carbon atoms (H/C) which satisfies the following relational expression (I):

$$(N/C) > 0.87 \times (H/C) - 0.06 \qquad (I),$$

(2) in an X-ray diffraction pattern obtained by using the CuKα ray as X-ray source, the material having a peak located at an angle of diffraction (2θ) of 23.5 to 25.5°, and (3) in a laser Raman spectrum in a range of wavenumber from 1,000 to 2,000 $cm^{-1}$, the material having at least two main peaks, a peak P1 between 1,355 and 1,385 $cm^{-1}$ and a peak P2 between 1,550 and 1,620 $cm^{-1}$, wherein a height L at a minimum point M between the P1 and the P2 from the base line and a height H1 at the P1 from the base line have a ratio (L/H1) of 0.7 to 0.95.

With reference to the condition (1) required to be satisfied by the nitrogen-containing carbon material according to the present invention, the presence ratio of carbon atoms, nitrogen atoms, and hydrogen atoms is determined by using a CHN analyzer.

In the nitrogen-containing carbon material according to the present invention, the number ratio of nitrogen atoms to carbon atoms (N/C) and the number ratio of hydrogen atoms to carbon atoms (H/C) are represented by the following relational expression:

$$(N/C) > 0.87 \times (H/C) - 0.06 \qquad (I).$$

A nitrogen-containing carbon material which does not satisfy expression (I) has a large (H/C) or a small (N/C), which means that it has a conjugated system which is not sufficiently developed or has a low nitrogen content. Therefore, such a material is not preferred.

The following expression is more preferred:

$$(N/C) > 0.91 \times (H/C) - 0.045 \qquad (II), \text{ and}$$

the following expression is most preferred:

$$(N/C) > 1.0 \times (H/C) - 0.040 \qquad (III).$$

In addition, in the nitrogen-containing carbon material according to the present invention, the number ratio of nitrogen atoms to carbon atoms (N/C) and the number ratio of hydrogen atoms to carbon atoms (H/C) preferably satisfy the following relational expression:

$$(N/C) < 1.2 \times (H/C) + 0.15 \qquad (IV).$$

A nitrogen-containing carbon material which does not satisfy expression (IV) is not preferred because it requires very large facilities and consumes a large amount of resources and energy in the production process and the carbonization process of azulmic acid.

The following expression is more preferred:

$$(N/C) < 1.2 \times (H/C) + 0.08 \qquad (V), \text{ and}$$

the following expression is most preferred:

$$(N/C) < 1.2 \times (H/C) + 0.01 \qquad (VI).$$

Expressions (I) to (VI) are derived as a range surrounding Examples in FIG. 15. That is, the range is surrounded by lines generally parallel to the line obtained by connecting Examples.

The number ratio of hydrogen atoms to carbon atoms (H/C) in the nitrogen-containing carbon material according to the present invention is preferably 0.01 to 0.5, more preferably 0.05 to 0.40, further preferably 0.05 to 0.35, and most preferably 0.05 to 0.15.

A too large (H/C) is not preferred because a conjugated system is not sufficiently developed, and a too small (H/C) is not preferred because (N/C) tends to be too small.

The number ratio of nitrogen atoms to carbon atoms (N/C) in the nitrogen-containing carbon material according to the present invention is 0.03 to 1.0, preferably 0.05 to 0.7, more preferably 0.08 to 0.4, and most preferably 0.15 to 0.3.

The nitrogen-containing carbon material according to the present invention can achieve a large (N/C) even with a small (H/C). That is, a carbon material containing a large number of nitrogen atoms can be achieved while a conjugated system is being sufficiently developed.

The nitrogen-containing carbon material according to the present invention may contain other elements than carbon, nitrogen and hydrogen. The content of other elements is preferably 15% by weight or less, more preferably 7% by weight or less, and most preferably 3% by weight or less, based on 100% by weight of the nitrogen-containing carbon material according to the present invention.

Oxygen can be included among other elements. Oxygen is often present in the form of a carboxyl group or a hydroxy group. When the nitrogen-containing carbon material is used for electronic materials, the presence of a large amount of these functional groups is not preferred because it causes irreversible adsorption. The presence of a halogen element such as chlorine or bromine is not preferred because it causes corrosion of a material or the like. The content of a halogen element is preferably 10% by weight or less, more preferably 3% by weight or less, further preferably 1% by weight or less, and most preferably 0.1% by weight or less.

With reference to the condition (2) required to be satisfied by the nitrogen-containing carbon material according to the present invention, the nitrogen-containing carbon material has a peak located at the angle of diffraction (2θ) of 23.5 to 25.5°, preferably has a peak located at 23.7 to 25.0°, and more preferably has a peak located at 23.9 to 24.5° in the X-ray diffraction pattern obtained by using the CuKα ray as an X-ray source. The peak preferably has the largest intensity at an angle of diffraction (2θ) of 15 to 50°. The nitrogen-containing carbon material according to the present invention has a layered structure. The interlayer spacing thereof corresponds to 3.49 to 3.78 angstroms, preferably 3.56 to 3.75 angstroms, and more preferably 3.64 to 3.72 angstroms. A large interlayer spacing is advantageous to the formation of an intercalation compound.

With reference to the condition (3) required to be satisfied by the nitrogen-containing carbon material according to the present invention, the nitrogen-containing carbon material according to the present invention, has at least two main peaks, a peak P1 between 1,355 and 1,385 $cm^{-1}$ and a peak P2 between 1,550 and 1,620 $cm^{-1}$, in the laser Raman spectrum in a range of wavenumber from 1,000 to 2,000 $cm^{-1}$. It is preferred that the nitrogen-containing carbon material has two main peaks, a peak P1 between 1,360 and 1,380 $cm^{-1}$ and a peak P2 between 1,570 and 1,585 $cm^{-1}$.

In the laser Raman spectrum of the nitrogen-containing carbon material according to the present invention, the ratio (L/H1) to be described below is 0.70 to 0.95, preferably 0.86 to 0.93, and most preferably 0.88 to 0.91. Here, the ratio (L/H1) in the laser Raman spectrum of the nitrogen-containing carbon material according to the present invention is a value related to the half-width of a peak. When the half-width is small, the value of (L/H1) is small, and when the half-width is large, the value of (L/H1) is large. In this invention (L/H1) is used as an index of the half-width, but it is also possible to determine the half-width by performing peak separation. The peak separation can be performed by using a known method such as the Lorentz function or the Gaussian function. It will be easily understood by those skilled in the art that a function having a high fitting rate may be used for the peak separation.

In the laser Raman spectrum of the nitrogen-containing carbon material according to the present invention, the peak P1 preferably has a half-width of 200 to 400 $cm^{-1}$, more preferably 250 to 350 $cm^{-1}$, and most preferably 270 to 320 $cm^{-1}$.

In the laser Raman spectrum of the nitrogen-containing carbon material according to the present invention, the ratio (L/H2) to be described below is preferably 0.60 to 0.90, more preferably 0.63 to 0.85, and most preferably 0.75 to 0.84. Here, the ratio (L/H2) in the laser Raman spectrum of the nitrogen-containing carbon material according to the present invention is a value related to the half-width of a peak. When the half-width is small, the value of (L/H2) is small, and when the half-width is large, the value of (L/H2) is large. In this invention (L/H2) is used as an index of the half-width, but it is also possible to determine the half-width by separating peaks. Peaks can be separated by using a known method such as the Lorentz function or the Gaussian function. It will be easily understood by those skilled in the art that a function having a high fitting rate may be used for separating peaks.

In the laser Raman spectrum of the nitrogen-containing carbon material according to the present invention, the peak P2 preferably has a half-width of 30 to 200 $cm^{-1}$, more preferably 80 to 170 $cm^{-1}$, and most preferably 100 to 150 $cm^{-1}$.

The above-described P1 and P2 are two main peaks having a Raman shift in the laser Raman spectrum between 1,340 and 1,620 $cm^{-1}$. P1 is a peak between 1,355 and 1,385 $cm^{-1}$ and P2 is a peak between 1,550 and 1,620 $cm^{-1}$.

In the present invention, the peak intensity can be determined from the laser Raman spectrum obtained by measurement using an Argon laser (wavelength of 540 nm, 2 mW) at a beam size of 5µ, an operation range of 1,000 to 2,000 $cm^{-1}$, and an elapsed time of 5 minutes.

FIG. 1 shows a schematic view of an example of the laser Raman spectrum of a nitrogen-containing carbon material according to the present invention. FIG. 1 is a figure for describing the ratio (L/H1) and the ratio (L/H2) used in the present invention, and it by no means limits the laser Raman spectrum obtained from the nitrogen-containing carbon material according to the present invention.

As shown in FIG. 1, B1 is the minimum intensity value in the range from 1,000 to 1,300 $cm^{-1}$, and B2 is the minimum intensity value in the range from 1,700 to 2,000 $cm^{-1}$. The base line in the laser Raman spectrum used in the present invention is a straight line obtained by connecting B1 to B2.

Next, C1 and C2 in FIG. 1 are the intersections of the vertical lines dropped from the peaks P1 and P2 to the Raman shift axis and the base line, respectively.

D is the intersection of the vertical line dropped from the minimum intensity value M between the peaks P1 and P2 to the Raman shift axis and the base line, and the height L is the length from the M to the intersection of the vertical line dropped to the Raman shift axis and the base line. Specifically, it is the length of a line segment MD in the laser Raman spectrum illustrated in FIG. 1.

On the other hand, the height H1 is the length from P1 to the intersection of the vertical line dropped to the Raman shift axis and the base line. The length of a line segment P1C1 corresponds to the height H1 in the laser Raman spectrum illustrated in FIG. 1. The height H2 is the length from P2 to the intersection of the vertical line dropped to the Raman shift axis and the base line. The length of a line segment P2C2 corresponds to the height H2 in the laser Raman spectrum illustrated in FIG. 1.

The nitrogen-containing carbon material according to the present invention preferably has peaks at 401.0±0.3 eV and 398.0±0.5 eV in the XPS spectrum of N1s as determined by X-ray photoelectron spectroscopy (XPS), more preferably at 401.0±0.2 eV and 398.0±0.3 eV, and most preferably at 401.0±0.1 eV and 398.0±0.1 eV. In the XPS spectrum of N1s, the peak around 401 eV corresponds to a nitrogen atom of the Center type or the Valley type, and the peak around 398 eV corresponds to a nitrogen atom of the Top type (refer, for example, to Carbon, vol. 40, p. 597-608 (2002)). By this, it is meant that nitrogen atoms are present in-plane or at the end of a carbon network plane as a quaternary nitrogen or a nitrogen in the form of pyridine, respectively. The nitrogen-containing carbon material according to the present invention preferably contains nitrogen atoms in these forms. The XPS spectrum is obtained under conditions including X-ray source: Al tube (Al-Kα ray), tube voltage: 15 kV, tube current: 10 mA, analysis area: ellipse of 600 μm×300 μm, capture area: N1s and C1s, and Pass-Energy: 20 eV. The obtained spectrum is corrected for energy using the peak location of C1s to define the values.

In the infrared absorption spectrum of the nitrogen-containing carbon material according to the present invention, the wavenumber to give the maximum of the peak intensity of absorbance in a wavenumber range of 1,500 to 1,800 $cm^{-1}$ is preferably located from 1,550 to 1,640 $cm^{-1}$.

In the infrared absorption spectrum of the nitrogen-containing carbon material according to the present invention, the ratio (Q2/Q1) of the intensity Q2 of a peak S2 of absorbance at a wavenumber of 2,200 to 2,280 $cm^{-1}$ to the intensity Q1 of the peak S1 of absorbance at a wavenumber of 1,550 to 1,640 $cm^{-1}$ is preferably 0.07 or less, more preferably 0.05 or less, and most preferably 0.02 or less. The peak of absorbance at a wavenumber of 2,200 to 2,280 $cm^{-1}$ is a peak derived from a nitrile group, and thus the smaller the preferred.

In the infrared absorption spectrum of the nitrogen-containing carbon material according to the present invention, the ratio (Q3/Q1) of the intensity Q3 of a peak S3 of absorbance at a wavenumber of 2,800 to 3,000 $cm^{-1}$ to the intensity Q1 of the peak S1 of absorbance at a wavenumber of 1,550 to 1,640 $cm^{-1}$ is preferably 0.10 or less, more preferably 0.05 or less, and most preferably 0.02 or less. The peak of absorbance at a wavenumber of 2,800 to 3,000 $cm^{-1}$ is a peak derived from a C—H group, and thus the smaller the preferred.

In the infrared absorption spectrum of the nitrogen-containing carbon material according to the present invention, the ratio (Q4/Q1) of the intensity Q4 of a peak S4 of absorbance at a wavenumber of 3,000 to 3,500 $cm^{-1}$ to the intensity Q1 of the peak S1 of absorbance at a wavenumber of 1,550 to 1,640 $cm^{-1}$ is preferably 0.80 or less, more preferably 0.70 or less, and most preferably 0.6 or less. The peak of absorbance at a wavenumber of 3,000 to 3,500 $cm^{-1}$ is a peak derived from an N—H group and an O—H group, and thus the smaller the preferred.

The peak intensity in the infrared absorption spectrum is defined as follows.

The intensity Q1 of the peak S1 is defined as follows. A1 is a point showing the minimum absorbance in the range from 1,000 to 1,200 $cm^{-1}$ and A2 is a point showing the minimum absorbance in the range from 1,700 to 1,900 $cm^{-1}$. A base line A1A2 is a straight line obtained by connecting A1 to A2.

Next, E1 is the intersection of the vertical line dropped from the peak S1 to the wavenumber axis of the infrared absorption spectrum and the base line A1A2. The intensity Q1 of the peak S1 is the length of a line segment S1E1 from the S1 to the intersection E1 of the vertical line dropped to the wavenumber axis of the infrared absorption spectrum and the base line.

The intensity Q2 of the peak S2 is defined as follows. A3 is a point showing the minimum absorbance in the range from 2,100 to 2,200 $cm^{-1}$ and A4 is a point showing the minimum absorbance in the range from 2,280 to 2,400 $cm^{-1}$. A base line A3A4 is a straight line obtained by connecting A3 to A4.

Next, E2 is the intersection of the vertical line dropped from the peak S2 to the wavenumber axis of the infrared absorption spectrum and the base line A3A4. The intensity Q2 of the peak S2 is the length of a line segment S2E2 from the S2 to the intersection E2 of the vertical line dropped to the wavenumber axis of the infrared absorption spectrum and the base line.

The intensity Q3 of the peak S3 is defined as follows. A5 is a point showing the minimum absorbance in the range from 2,700 to 2,800 $cm^{-1}$ and A6 is a point showing the minimum absorbance in the range from 3,000 to 3,100 $cm^{-1}$. A base line A5A6 is a straight line obtained by connecting A5 to A6.

Next, E3 is the intersection of the vertical line dropped from the peak S3 to the wavenumber axis of the infrared absorption spectrum and the base line A5A6. The intensity Q3 of the peak S3 is the length of a line segment S3E3 from the S3 to the intersection E3 of the vertical line dropped to the wavenumber axis of the infrared absorption spectrum and the base line.

The intensity Q4 of the peak S4 is defined as follows. A7 is a point showing the minimum absorbance in the range from 2,500 to 3,000 $cm^{-1}$ and A8 is a point showing the minimum absorbance in the range from 3,500 to 4,000 $cm^{-1}$. A base line A7A8 is a straight line obtained by connecting A7 to A8.

Next, E4 is the intersection of the vertical line dropped from the peak S4 to the wavenumber axis of the infrared absorption spectrum and the base line A7A8. The intensity Q4 of the peak S4 is the length of a line segment S4E4 from the S4 to the intersection E4 of the vertical line dropped to the wavenumber axis of the infrared absorption spectrum and the base line.

A nitrogen-containing carbon material of the present invention may be produced by any production method or from any starting raw material as long as a nitrogen-containing carbon material having characteristics as specified in the present invention can be obtained. For example, it can be produced by carbonizing azulmic acid which is mainly obtained by polymerizing hydrogen cyanide.

Next, a method of producing a nitrogen-containing carbon material of the present invention by carbonizing azulmic acid which is mainly obtained by polymerizing hydrogen cyanide will be described.

FIG. 2 shows a schematic diagram of a process for producing a nitrogen-containing carbon material according to the present invention. As shown in FIG. 2, the production method according to the present invention comprises a process for polymerizing a raw material containing hydrogen cyanide in a process S10 and a process (process S12) for carbonizing azulmic acid obtained in the process S10. Each process will be described in detail below.

The hydrogen cyanide used in the process S10 of the production method according to the present invention can include, but is not limited to, those produced in known methods. Specifically, there can be used those by-produced in a method of producing acrylonitrile or methacrylonitrile by gas-phase catalytic reaction in which propylene, isobutylene, tert-butyl alcohol, propane or isobutane is allowed to react with a gas containing ammonia and oxygen in the presence of a catalyst. Therefore, the hydrogen cyanide used in the process S10 is available at a very low cost. In order to increase production of hydrogen cyanide, such a raw material that produces hydrogen cyanide by ammoxidation, for example methanol, can be supplied to a reactor.

There can also be used hydrogen cyanide produced by the Andrussow process in which methane, a main component of natural gas, is allowed to react with a gas containing ammonia and oxygen in the presence of a catalyst. This method is also a method by which hydrogen cyanide can be obtained at a very low cost by use of methane.

Of course, a laboratory production method using sodium cyanide or the like may be employed, but industrially produced hydrogen cyanide as described above is preferably used.

Azulmic acid used in the process S12 of the production method according to the present invention includes, but is not limited to, a hydrogen cyanide polymer having a black to black-brown color obtained by polymerizing a raw material mainly containing hydrogen cyanide (refer to the process S10). In the raw material containing hydrogen cyanide used in the present invention, the presence ratio of other polymerizable materials relative to hydrogen cyanide is 40% by weight or less, preferably 10% by weight or less, more preferably 5% by weight or less, and most preferably 1% by weight or less.

Azulmic acid can be produced by polymerizing hydrogen cyanide using various methods (refer to the process S10). Examples of the methods can include a method in which liquefied hydrogen cyanide or an aqueous hydrogen cyanide solution is heated, left standing for a long time, mixed with a base, irradiated with light, applied with high energy radiation, or subjected to various discharge; a method such as electrolysis of an aqueous potassium cyanide solution; and a known method (for example, a method described in Angew. Chem., vol. 72, 379-384 (1960) and literatures cited therein, and Shinku Kagaku, vol. 16, 64-22 (1969) and literatures cited therein).

In a method of polymerizing hydrogen cyanide in the presence of a base, examples of the base can include sodium hydroxide, potassium hydroxide, sodium cyanide, potassium cyanide, and triethylamine.

Azulmic acid can also be produced by recovering it from the purification process of hydrogen cyanide that is by-produced in the ammoxidation of propylene or the like.

Since azulmic acid is insoluble in a solvent, its structure is not identified, but Angew. Chem., vol. 72, 379-384 (1960) and Shinku Kagaku, vol. 16, 64-72 (1969) estimate the following structural formulas.

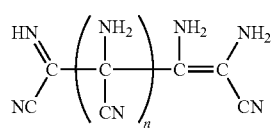
[Formula 1]

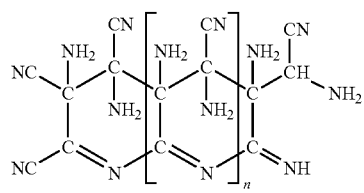
[Formula 2]

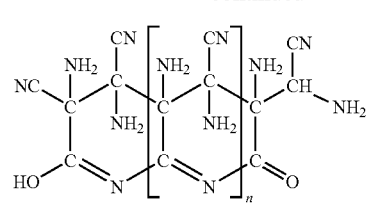
[Formula 3]

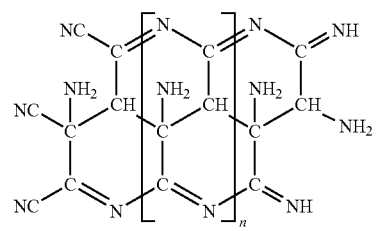
[Formula 4]

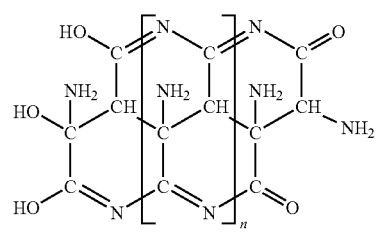
[Formula 5]

In reality, in the polymer structures on the basis of these structural formulas, part of nitrogen in the six-membered ring is replaced with carbon or conversely part of carbon in the six-membered ring is replaced with nitrogen. Further, although functional groups are shown in these structural formulas, these amino groups, imino groups, nitrile groups, hydroxy groups, and carbonyl groups may be interchanged with each other or eliminated or converted to known functional groups such as carboxylic acid groups, nitro groups, nitroso groups, N-oxide groups and alkyl groups.

The Formula 1 has a linear structure; the Formulas 2 and 3 each have a ladder structure; and the Formulas 4 and 5 each have a ladder-ladder condensed structure. It is also estimated that there may be a structure condensed between the ladder-ladder condensed structures or a structure combined or condensed between the Formulas 1, 2, 3, 4, and 5.

The composition of azulmic acid used in the present invention can be determined using a CHN analyzer. The ratio of the percent by weight of nitrogen to the percent by weight of carbon is preferably 0.2 to 1.0, more preferably 0.3 to 0.9, and most preferably 0.4 to 0.9. The ratio of the percent by weight of hydrogen to the percent by weight of carbon is preferably 0.03 to 0.2, more preferably 0.05 to 0.15, and most preferably 0.08 to 0.11.

Azulmic acid used in the present invention preferably has a Raman shift having peaks at positions from 1,300 to 1,400 $cm^{-1}$ and from 1,500 to 1,600 $cm^{-1}$ in the laser Raman spectrum in a range of wavenumber from 1,000 to 2,000 $cm^{-1}$, most preferably from 1,360 to 1,380 $cm^{-1}$ and from 1,530 to 1,550 $cm^{-1}$.

FIG. 3 shows a schematic view of an example of the laser Raman spectrum of azulmic acid used in the present invention. As shown in FIG. 3, azulmic acid used in the present invention preferably has at least two main peaks, a peak P3 between 1,300 and 1,400 $cm^{-1}$ and a peak P4 between 1,500 and 1,600 $cm^{-1}$ in the laser Raman spectrum in a range of wavenumber from 1,000 to 2,000 $cm^{-1}$, more preferably a peak P3 between 1,350 and 1,390 $cm^{-1}$ and a peak P4 between 1,510 and 1,570 cm$^{-1}$, and most preferably a peak P3 between 1,360 and 1,380 cm$^{-1}$ and a peak P4 between 1,530 and 1,550 cm$^{-1}$.

Further, (H3/H4), (L1/H3), and (L1/H4) as shown in FIG. 3 are the peak of the laser Raman spectrum obtained by measurement using an Argon laser (wavelength of 540 nm, 2 mW) at a beam size of 5μ, an operation range of 1,000 to 2,000 cm$^{-1}$, and an elapsed time of 5 minutes and are defined as follows.

That is, as shown in FIG. 3, B3 is the minimum intensity value in the range from 1,000 to 1,300 cm$^{-1}$, and B4 is the minimum intensity value in the range from 1,700 to 2,000 cm$^{-1}$. The base line in the laser Raman spectrum used in the present invention is a straight line obtained by connecting B3 to B4.

Next, C3 and C4 in FIG. 3 are the intersections of the vertical lines dropped from the peaks P3 and P4 to the Raman shift axis and the base line, respectively. D1 is the intersection of the vertical line dropped from the minimum intensity value M1 between the peaks P3 and P4 to the Raman shift axis and the base line, and the height L1 is the length from the M1 to the intersection of the vertical line dropped to the Raman shift axis and the base line. Specifically, it is the length of a line segment MIDI in the laser Raman spectrum illustrated in FIG. 3. On the other hand, the height H3 is the length from the peak P3 to the intersection of the vertical line dropped to the Raman shift axis and the base line and corresponds to a line segment P3C3. The height H4 is the length from P4 to the intersection of the vertical line dropped to the Raman shift axis and the base line and corresponds to a line segment P4C4.

The ratio of (H3/H4) for azulmic acid used in the present invention is 0.5 to 1.0, preferably 0.6 to 0.9, and more preferably 0.7 to 0.8. Further, the ratio of (L1/H3) for azulmic acid used in the present invention is 0.4 to 0.9, preferably 0.6 to 0.8, and more preferably 0.65 to 0.75. On the other hand, the ratio of (L1/H4) for azulmic acid used in the present invention is 0.7 to 0.99, preferably 0.8 to 0.95, and more preferably 0.65 to 0.75.

Azulmic acid used in the present invention has a strong peak located at the angle of diffraction (2θ) of 26.8±1°, preferably located at 26.8±0.5°, and more preferably located at 26.8±0.2° in the range of 10 to 50° in the X-ray diffraction pattern obtained by using the CuKα ray as an X-ray source. Further, in addition to the above-described peak, azulmic acid used in the present invention has a peak also located at the angle of diffraction (2θ) of 12.3±1°, preferably located at 12.3±0.5° in the range of 10 to 50° in the X-ray diffraction pattern obtained by using the CuKα ray as an X-ray source.

Moreover, the X-ray diffraction pattern of azulmic acid used in the present invention is subjected to peak separation using a known function having a high fitting rate such as the Lorentz function or the Gaussian function. The separated peaks preferably have a half-width within a specific range. Specifically, after the X-ray diffraction pattern of azulmic acid used in the present invention is subjected to peak separation using a function having a high fitting rate, which is either the Lorentz function or the Gaussian function, the peak located at a position of 26.8±1° has a half-width of 6 to 12°, preferably 8 to 10°, and more preferably 8.5 to 9.5°.

From the X-ray diffraction pattern of the azulmic acid used in the present invention, it is suggested that the azulmic acid has a layered structure. Such an example is not known as a precursor of a nitrogen-containing carbon material before carbonization. In particular, in the production of a nitrogen-containing carbon material having a layered structure, it is considered that such a structure of a precursor before carbonization is advantageous in terms of developing characteristics such as a layered structure, a high nitrogen content and a low hydrogen content.

When azulmic acid used in the present invention is subjected to Soxhlet extraction with chloroform for 5 hours, the quantity of a component eluted is preferably 30% by weight or less, more preferably 10% by weight or less, and most preferably 1% by weight or less. The component eluted is a low molecular weight compound or a linear polymer, and a high quantity of the component eluted means that the degree of polymerization is not high enough.

Azulmic acid used in the present invention is obtained by, but is not limited to, polymerization of a raw material mainly containing hydrogen cyanide. A method of polymerizing hydrogen cyanide is suitable as a method of producing the above-described azulmic acid which has the laser Raman spectrum and the X-ray diffraction pattern each having a specific peak.

The method of carbonizing azulmic acid used in the present invention (refer to the process S12 in FIG. 2) is performed by, but is not limited to, heat-treating azulmic acid at a temperature ranging from 600 to 3,000° C., preferably from 700 to 2,000° C., more preferably from 750 to 1,500° C., and most preferably from 800 to 1,100° C. in an inert gas atmosphere using a rotary furnace, a tunnel furnace, a tubular furnace, a fluidized calcining furnace, or the like. Examples of the inert gas include, but are not limited to, an inert gas such as nitrogen, argon, helium, neon, or carbon dioxide, and vacuum. Nitrogen gas is the most preferred. The inert gas atmosphere may includes a stationary or a flowing inert gas, the flowing inert gas being preferred. The concentration of oxygen in the inert gas is preferably 5% or less, more preferably 1% or less, and most preferably 1,000 ppm or less. The carbonization time ranges from 10 seconds to 100 hours, preferably from 5 minutes to 10 hours, more preferably from 15 minutes to 5 hours, and most preferably from 30 minutes to 2 hours. The pressure in the carbonization process is from 0.01 to 5 MPa, preferably from 0.05 to 1 MPa, more preferably from 0.08 to 0.3 MPa, and most preferably from 0.09 to 0.15 MPa. High pressure processing is not preferred because it produces a diamond structure composed of the sp3 orbital.

Before carbonization, stabilization treatment for performing heat-treatment in air having a relatively low temperature may be performed. According to a production method of the present invention, a nitrogen-containing carbon material satisfied with a high nitrogen content and a low hydrogen content without the stabilization treatment. The nitrogen-containing carbon material produced by the production method according to the present invention preferably takes a layered structure composed of the sp2 orbital.

The production method according to the present invention comprises a method of producing a nitrogen-containing carbon material including a process of carbonizing azulmic acid. Preferably, the azulmic acid can be obtained by polymerizing a raw material containing hydrogen cyanide.

The method of producing a nitrogen-containing carbon material according to the present invention is suitable for producing a nitrogen-containing carbon material which satisfies the following conditions (1), (2), and (3):

(1) the material having a number ratio of nitrogen atoms to carbon atoms (N/C) and a number ratio of hydrogen atoms to carbon atoms (H/C) which satisfies the following relational expression (I):

$$(N/C) > 0.87 \times (H/C) - 0.06 \qquad (I),$$

(2) in the X-ray diffraction pattern obtained by using the CuKα ray as an X-ray source, the nitrogen-containing carbon material having a peak located at the angle of diffraction (2θ) of 23.5 to 25.5°, and (3) in the laser Raman spectrum in a range of wavenumber from 1,000 to 2,000 cm$^{-1}$, the material having at least two main peaks, a peak P1 between 1,355 and 1,385 cm$^{-1}$ and a peak P2 between 1,550 and 1,620 cm$^{-1}$, wherein a height L at a minimum point M between P1 and P2 from the base line and a height H1 at P1 from the base line have a ratio (L/H1) is 0.7 to 0.95.

EXAMPLES

The present invention will now be described in further detail in reference to Examples and the like of the present invention, but these are illustrative only and the present invention is not limited to the following specific examples. Various changes may be made to Examples to be shown below by those skilled in the art to implement the present invention, and these changes are encompassed in the scope of the claims of the present invention.

Production Example

Production of Azulmic Acid

In the present invention, azulmic acid was recovered in the process shown in FIG. 4.

To a hydrogen cyanide removal column 1 through an acrylonitrile recovery column 16, was sent 1,700 kg/h of hydrogen cyanide by-produced in the production of acrylonitrile by the ammoxidation of propylene. From a partial condenser at the top of the column, was obtained 1,718 kg/h of crude hydrogen cyanide vapor (2) at 32° C. together with a small amount of acrylonitrile and water. The composition of the crude hydrogen cyanide vapor (2) was as follows:

| | |
|---|---|
| Acrylonitrile | 5% by weight, |
| Water | 1% by weight, and |
| Hydrogen cyanide | 94% by weight. |

To the vapor phase, was added 1.2 Kg/h of sulfurous acid gas as a stabilizer and 71 m³/h of nitrogen gas, and the resulting mixture was sent to the 28th plate from the top of a hydrogen cyanide purification column 3 which is a plate column with 45 plates. The hydrogen cyanide purification column 3 has a diameter of 1 m and a height of 22 m in size.

On the other hand, an aqueous solution containing acetonitrile and hydrogen cyanide (19) was removed from a side flow in the lower part of the acrylonitrile recovery column 16 and sent to an acetonitrile concentrating column 8, wherein at the outlet of a partial condenser at the top of the column was obtained 22 kg/h of crude hydrogen cyanide vapor (10) having a composition as follows:

| | |
|---|---|
| Acetonitrile | 16% by weight, |
| Water | 7% by weight, and |
| Hydrogen cyanide | 77% by weight. |

Then, to the crude hydrogen cyanide (10) maintained at 40 to 50° C. through a pipe with heating, was added 0.035 Kg/h of sulfurous acid gas as a stabilizer and 18 m³/h of nitrogen gas, and the resulting mixture was sent to a vapor phase at the lower part of a hydrogen cyanide absorption column 7.

About ⅔ of purified hydrogen cyanide cooled and liquified at a partial condenser at the top of the hydrogen cyanide purification column 3 was refluxed back to the top of the column, and the remaining portion was removed as purified liquified hydrogen cyanide (5) at a rate of 1,591 kg/h. Hydrogen cyanide vapor (6) at the outlet of the partial condenser evaporated at 20° C. at a rate of 386 kg/h and was sent to the hydrogen cyanide absorption column 7 together with the crude hydrogen cyanide (10). The composition of the hydrogen cyanide vapor (6) was as follows:

| | |
|---|---|
| Nitrogen gas | 23% by weight, and |
| Hydrogen cyanide | 77% by weight. |

The hydrogen cyanide absorption column 7 has a diameter of 0.5 m, a height of 9 m, 10 column plates, and a shell-and-tube falling-film cooling zone of 0.5 m. An absorption liquid (11), which was obtained by cooling 3,000 kg/h of the bottom liquid in the hydrogen cyanide purification column 3 from 104° C. to 5° C., was sent to the top of the hydrogen cyanide absorption column 7.

The temperature of the absorption liquid increased with the absorption of hydrogen cyanide but was kept at 15° C. with a cooling agent in the outside of a cooler.

An absorption liquid (12) with hydrogen cyanide absorbed therein was removed from the bottom of the column at a rate of 3,315 kg/h, exchanged heat with the absorption liquid (11) to be sent to the top of the column, and then sent to the 33rd plate from the top of the hydrogen purification column 3 at a temperature of 60° C. (the concentration of hydrogen cyanide in the absorption liquid was 9.5%).

The amount of hydrogen cyanide contained in a gas (14) exhausted at a rate of 111 kg/h from the top of the hydrogen cyanide absorption column 7 was 10 ppm or less.

Then, from the 36th plate from the top of the hydrogen cyanide purification column 3 which was operated at atmospheric pressure, were removed, as an impurity, acrylonitrile, acetonitrile, a small amount of hydrogen cyanide, and water at a rate of 245 kg/h to be sent to the acrylonitrile recovery column. The composition of the removed liquid (15) was as follows:

| | |
|---|---|
| Acrylonitrile | 35.0% by weight, |
| Hydrogen cyanide | 0.9% by weight, |
| Acetonitrile | 1.4% by weight, and |
| Water | 62.7% by weight. |

Under such a steady-state operation, azulmic acid by-produced by polymerization in the hydrogen cyanide purification column 3 which fell down to the bottom thereof was recovered from the bottom of the hydrogen cyanide purification column, washed with water, and dried in a dryer at 120° C. for 5 hours. The obtained azulmic acid was a black, non-sticky powder.

<Analytical Method>

Analytical instruments and analysis conditions in Examples are described below.

(CHN Analysis)

The CHN analysis was carried out by using MICRO CORDER JM10 manufactured by J-Science Lab Co., Ltd. and filling 2,500 μg of a sample in a sample holder. A sample furnace, a combustion furnace (copper oxide catalyst), and a reduction furnace (composed of silver particles+copper oxide zone, a reduced copper zone, and a copper oxide zone) are set at 950° C., 850° C., and 550° C., respectively. Oxygen is set at 15 ml/min, and He is set at 150 ml/min. The detector is a TCD. Antipyrine is used for calibration according to a method described in a manual.

(Measurement Method of Laser Raman Spectrum)

A sample was milled in an agate mortar and mounted in a cell for powder for measuring the laser Raman spectrum under the following conditions:

Instrument: System-3000 manufactured by Reninshaw Corporation, Light source: Ar laser (wavelength of 540 nm, 2 mW), at a beam size of 5μ, an operation range of 1,000 to 2,000 $cm^{-1}$, and an elapsed time of 5 minutes.

(Measurement Method of X-Ray Diffraction)

A sample was milled in an agate mortar and filled in a cell for powder for measuring the X-ray diffraction pattern under the following conditions:

Instrument: Rint 2500 manufactured by Rigaku Corporation, X-ray source: Cu tube (Cu-Kα ray), tube voltage: 40 kV, tube current: 200 mA, dispersive crystal: yes, scattering slit: 1°, divergence slit: 1°, light-receiving slit: 0.15 mm, scan rate: 2°/min, sampling width: 0.02°, and scanning method: 2θ/θ method.

Correction of the X-ray diffraction angle (2θ) was performed using the data of the X-ray diffraction angle obtained for silicon powder.

(Measurement Method of X-Ray Photoelectron Spectroscopy (XPS))

A sample was milled in an agate mortar and filled in a cell for powder for measuring the XRS spectrum under the following conditions: Instrument: ESCALAB 250 manufactured by Thermo Electron Corporation, X-ray source: Al tube (Al-Kα ray), tube voltage: 15 kV, tube current: 10 mA, analysis area: ellipse of 600 μm×300 μm, capture area: N1s and C1s, and Pass-Energy: 20 eV. The obtained spectrum was corrected for energy using the peak location of C1s.

(Measurement Method of IR Spectrum)

The IR spectrum was measured under conditions of a transmission method, MCT detection, and a resolution of 4 $cm^{-1}$ using FTS 575C/UMA 500 manufactured by Variant Corporation. A sample was diluted using KBr to a concentration (about 100-fold) in which the spectrum can be easily measured and was tableted at a pressing pressure of 200 $kg/cm^2$ for sample preparation.

(Analysis of Azulmic Acid)
(CHN Analysis)

The composition of azulmic acid obtained in the above production example was found to be 40.0% by weight of carbon, 29.8% by weight of nitrogen, and 4.1% by weight of hydrogen. Since adsorbed water may remain under the drying condition as described herein, the difference is believed to be derived from oxygen and hydrogen mainly from adsorbed water.

(Measurement of Laser Raman Spectrum)

FIG. 5 shows the laser Raman spectrum of azulmic acid obtained in the production example of the present invention. From the laser Raman spectrum shown in FIG. 5, the azulmic acid obtained in the above production example was found to have strong peaks at 1,543 $cm^{-1}$ and 1,375 $cm^{-1}$ in the range from 1,000 to 2,000 $cm^{-1}$.

(Measurement of X-Ray Diffraction)

FIG. 6 shows the X-ray diffraction pattern of azulmic acid obtained in the production example of the present invention. From the X-ray diffraction pattern shown in FIG. 6, the azulmic acid obtained in the above production example was found to have the strongest peak at 27.00 and a broad peak around 12.30 in the range from 5 to 50°.

(Elution Test by Chloroform)

Soxhlet extraction was performed using 3.00 g of azulmic acid and 100 g of chloroform for 5 hours. The amount of a component eluted was 0.06% by weight. It was estimated that the amount of a linear structure and a low-molecular weight substance was very small and most of the acid was composed of a polymer having condensed rings.

EXAMPLE 1

The obtained azulmic acid in an amount of 12 g was filled in a quartz tube having an inner diameter of 25 mm, raised to a temperature of 800° C. over 50 minutes in a nitrogen gas flow of 300 Ncc/min. under atmospheric pressure, and held at 800° C. for one hour for carbonization, obtaining 4.4 g of a nitrogen-containing carbon material. The yield was 37%. The oxygen concentration of the nitrogen gas used was found to be 1 ppm as a result of measurement using a trace oxygen analyzer (306WA-type, manufactured by Teledyne Analytical Instruments Company.

<Analysis of Nitrogen-Containing Carbon Material>
(Results of CHN Analysis)

The nitrogen-containing carbon material obtained in Example 1 was found to contain 68.6% by weight of carbon, 24.0% by weight of nitrogen, and 1.8% by weight of hydrogen. The number ratio of nitrogen atoms to carbon atoms (N/C) is 0.30. The number ratio of hydrogen atoms to carbon atoms (H/C) is 0.31.

(Results of Measurement of Laser Raman Spectrum)

FIG. 7 shows the laser Raman spectrum of the nitrogen-containing carbon material obtained in Example 1 of the present invention. From the laser Raman spectrum shown in FIG. 7, the nitrogen-containing carbon material obtained in Example 1 was found to have peaks around 1,355 $cm^{-1}$ and around 1,570 $cm^{-1}$ in the range from 1,000 to 2,000 $cm^{-1}$ and have a ratio of (L/H1) of 0.85.

For reference, FIG. 8 shows results of a fitting by the Gaussian function of the laser Raman spectrum as described above by assuming the number of peaks as two. The peak at 1,355 $cm^{-1}$ had a half-width of 302 $cm^{-1}$, and the peak at 1,570 $cm^{-1}$ had a half-width of 137 $cm^{-1}$. It is understood that the nitrogen-containing carbon material obtained in Example 1 has not only a larger chemical shift than that of a conventional carbon material, but also a very large half-width.

(Results of Measurement of X-Ray Diffraction)

FIG. 9 shows the X-ray diffraction pattern of the nitrogen-containing carbon material obtained in Example 1 of the present invention. As is apparent from the X-ray diffraction pattern shown in FIG. 9, the nitrogen-containing carbon material obtained in Example 1 was found to have a main peak around 25.0° and also a peak around 44.7° in the range from 5 to 50°. The whole of the X-ray diffraction pattern shows that the nitrogen-containing carbon material has a layered structure.

(Results of Measurement of X-Ray Photoelectron Spectroscopy (XPS))

FIG. 10 shows the XPS spectrum of N1s of the nitrogen-containing carbon material obtained in Example 1 of the present invention. As is apparent from the XPS spectrum of N1s shown in FIG. 10, the nitrogen-containing carbon material obtained in Example 1 was found to have peaks at 398.0 eV and 400.7 eV in the range from 392 to 410 eV.

(Results of Measurement of IR Spectrum)

In the infrared absorption spectrum of the nitrogen-containing carbon material obtained in Example 1, the maximum of the peak intensities of absorbance in a wavenumber range of 1,500 to 1,800 cm$^{-1}$ had a wavenumber of 1,612 cm$^{-1}$. The ratios (Q2/Q1) and (Q3/Q1) were 0.01 or less because the Q2 peak and the Q3 peak were not observed. The ratio (Q4/Q1) was 0.50.

EXAMPLE 2

The obtained azulmic acid in an amount of 12 g was filled in a quartz tube having an inner diameter of 25 mm, raised to a temperature of 1,000° C. over one hour ten minutes in a nitrogen gas flow of 300 Ncc/min. under atmospheric pressure, and held at 1,000° C. for one hour for carbonization, obtaining 3.4 g of a nitrogen-containing carbon material. The yield is 28%. The oxygen concentration of the nitrogen gas used was found to be 1 ppm as a result of measurement using a trace oxygen analyzer (306WA-type, manufactured by Teledyne Analytical Instruments Company).
<Analysis of Nitrogen-Containing Carbon Material>
(Results of CHN Analysis)

The nitrogen-containing carbon material obtained in Example 2 was found to contain 89.2% by weight of carbon, 8.7% by weight of nitrogen, and 0.8% by weight of hydrogen. The number ratio of nitrogen atoms to carbon atoms (N/C) is 0.085. The number ratio of hydrogen atoms to carbon atoms (H/C) is 0.10.
(Results of Measurement of Laser Raman Spectrum)

FIG. 11 shows the laser Raman spectrum of the nitrogen-containing carbon material obtained in Example 2 of the present invention. As is apparent from the laser Raman spectrum shown in FIG. 11, the nitrogen-containing carbon material obtained in Example 2 was found to have peaks around 1,382 cm$^{-1}$ and around 1,585 cm$^{-1}$ in the range from 1,000 to 2,000 cm$^{-1}$ and have a ratio (L/H1) of 0.88.

For reference, FIG. 12 shows results of a fitting by the Gaussian function of the laser Raman spectrum as described above by assuming the number of peaks as two. The peak at 1,382 cm$^{-1}$ had a half-width of 298 cm$^{-1}$, and the peak at 1,585 cm$^{-1}$ had a half-width of 122 cm$^{-1}$. It is understood that the nitrogen-containing carbon material obtained in Example 2 has not only a larger chemical shift than that of a conventional carbon material, but also a very large half-width.
(Results of Measurement of X-Ray Diffraction)

FIG. 13 shows the X-ray diffraction pattern of the nitrogen-containing carbon material obtained in Example 2 of the present invention. As is apparent from the X-ray diffraction pattern shown in FIG. 13, the nitrogen-containing carbon material obtained in Example 2 was found to have a main peak around 24.1° and also a peak around 44.3° in the range from 5 to 50°. It is understood that the nitrogen-containing carbon material has a structure having a very large interlayer spacing and that it has a layered structure from the whole of the X-ray diffraction pattern.
(Measurement of X-Ray Photoelectron Spectroscopy (XPS))

FIG. 14 shows the XPS spectrum of N1s of the nitrogen-containing carbon material obtained in Example 2 of the present invention. As is apparent from the XPS spectrum of N1s shown in FIG. 14, the nitrogen-containing carbon material obtained in Example 2 was found to have peaks at 398.0 eV and 401.0 eV in the range from 392 to 410 eV, in the range from 392 to 410 eV.
(Results of Measurement of IR Spectrum)

In the infrared absorption spectrum of the nitrogen-containing carbon material obtained in Example 1, the maximum of the peak intensities of absorbance in a wavenumber range of 1,500 to 1,800 cm$^{-1}$ had a wavenumber of 1,612 cm$^{-1}$. The ratios (Q2/Q1) and (Q3/Q1) were 0.01 or less because the Q2 peak and the Q3 peak were not observed. The ratio (Q4/Q1) was 0.47.

EXAMPLE 3

The obtained azulmic acid in an amount of 12 g was filled in a quartz tube having an inner diameter of 25 mm, raised to a temperature of 600° C. over 40 minutes in a nitrogen gas flow of 300 Ncc/min. under atmospheric pressure, and held at 600° C. for one hour for carbonization, obtaining 6.8 g of a nitrogen-containing carbon material. The yield is 57%. The oxygen concentration of the nitrogen gas used was found to be 1 ppm as a result of measurement using a trace oxygen analyzer (306WA-type, manufactured by Teledyne Analytical Instruments Company).
<Analysis of Nitrogen-Containing Carbon Material>
(Results of CHN Analysis)

The nitrogen-containing carbon material obtained in Example 3 was found to contain 56.6% by weight of carbon, 32.1% by weight of nitrogen, and 2.2% by weight of hydrogen. The number ratio of nitrogen atoms to carbon atoms (N/C) is 0.30. The number ratio of hydrogen atoms to carbon atoms (H/C) is 0.31.
(Results of Measurement of Laser Raman Spectrum)

The nitrogen-containing carbon material obtained in Example 3 of the present invention was found to have peaks around 1,360 cm$^{-1}$ and around 1,593 cm$^{-1}$ in the range from 1,000 to 2,000 cm$^{-1}$ and have a ratio (L/H1) of 0.76.
(Results of Measurement of X-Ray Diffraction)

The nitrogen-containing carbon material obtained in Example 3 of the present invention was found to have a main peak around 25.1° and also a peak around 44.3° in the range from 5 to 50°. It is understood that the nitrogen-containing carbon material has a structure having a very large interlayer spacing.

COMPARATIVE EXAMPLE 1

A melamine resin, which has the highest content of nitrogen as a precursor of a nitrogen-containing carbon material, was subjected to carbonization. That is, 12 g of a melamine resin was filled in a quartz tube having an inner diameter of 25 mm and subjected to carbonization at 800° C. in the same manner as in Example 1 to obtain 1.5 g of a nitrogen-containing carbon material. The yield is 13%.
<Analysis of Nitrogen-Containing Carbon Material>
(Results of CHN Analysis)

The nitrogen-containing carbon material obtained in Comparative Example 1 was found to contain 68.2% by weight of carbon, 17.9% by weight of nitrogen, and 1.9% by weight of hydrogen. The number ratio of nitrogen atoms to carbon atoms (N/C) is 0.22. The number ratio of hydrogen atoms to carbon atoms (H/C) is 0.35.

COMPARATIVE EXAMPLE 2

A melamine resin in an amount of 12 g was filled in a quartz tube having an inner diameter of 25 mm and subjected to carbonization at 1,000° C. in the same manner as in Example 2 to obtain 1.0 g of a nitrogen-containing carbon material. The yield is 8%.
<Analysis of Nitrogen-Containing Carbon Material>
(Results of CHN Analysis)

The nitrogen-containing carbon material obtained in Comparative Example 2 was found to contain 78.2% by weight of carbon, 7.8% by weight of nitrogen, and 1.5% by weight of hydrogen. The number ratio of nitrogen atoms to carbon atoms (N/C) is 0.080. The number ratio of hydrogen atoms to carbon atoms (H/C) is 0.23.

COMPARATIVE EXAMPLE 3

A polyaniline in an amount of 12 g was filled in a quartz tube having an inner diameter of 25 mm and subjected to carbonization at 800° C. in the same manner as in Example 1 to obtain 2.8 g of a nitrogen-containing carbon material. The yield is 23%.
<Analysis of Nitrogen-Containing Carbon Material>
(Results of CHN Analysis)
The nitrogen-containing carbon material obtained in Comparative Example 3 was found to contain 77.3% by weight of carbon, 7.5% by weight of nitrogen, and 2.0% by weight of hydrogen. The number ratio of nitrogen atoms to carbon atoms (N/C) is 0.08. The number ratio of hydrogen atoms to carbon atoms (H/C) is 0.31.

Comparative Example 4

A polyaniline in an amount of 12 g was filled in a quartz tube having an inner diameter of 25 mm and subjected to carbonization at 1,000° C. in the same manner as in Example 2 to obtain 2.0 g of a nitrogen-containing carbon material. The yield is 17%.
<Analysis of Nitrogen-Containing Carbon Material>
(Results of CHN Analysis)
The nitrogen-containing carbon material obtained in Comparative Example 4 was found to contain 92.0% by weight of carbon, 2.7% by weight of nitrogen, and 1.0% by weight of hydrogen. The number ratio of nitrogen atoms to carbon atoms (N/C) is 0.02. The number ratio of hydrogen atoms to carbon atoms (H/C) is 0.13.

COMPARATIVE EXAMPLE 5

A polyacrylonitrile in an amount of 12 g was filled in a quartz tube having an inner diameter of 25 mm and subjected to carbonization at 800° C. in the same manner as in Example 1 to obtain 4 g of a nitrogen-containing carbon material. The yield is 33%.
<Analysis of Nitrogen-Containing Carbon Material>
(Results of CHN Analysis)
The nitrogen-containing carbon material obtained in Comparative Example 5 was found to contain 77.0% by weight of carbon, 13.9% by weight of nitrogen, and 1.8% by weight of hydrogen. The number ratio of nitrogen atoms to carbon atoms (N/C) is 0.15. The number ratio of hydrogen atoms to carbon atoms (H/C) is 0.28%.

COMPARATIVE EXAMPLE 6

A polyacrylonitrile in an amount of 12 g was filled in a quartz tube having an inner diameter of 25 mm and subjected to carbonization at 1,000° C. in the same manner as in Example 2 to obtain 2.9 g of a nitrogen-containing carbon material. The yield is 24%.
<Analysis of Nitrogen-Containing Carbon Material>
(Results of CHN Analysis)
The nitrogen-containing carbon material obtained in Comparative Example 6 was found to contain 89.9% by weight of carbon, 6.0% by weight of nitrogen, and 1.2% by weight of hydrogen. The number ratio of nitrogen atoms to carbon atoms (N/C) is 0.057. The number ratio of hydrogen atoms to carbon atoms (H/C) is 0.16.

COMPARATIVE EXAMPLE 7

A fully aromatic polyimide in an amount of 12 g was filled in a quartz tube having an inner diameter of 25 mm and subjected to carbonization at 800° C. in the same manner as in Example 1 to obtain 6.9 g of a nitrogen-containing carbon material. The yield is 58%.
<Analysis of Nitrogen-Containing Carbon Material>
(Results of CHN Analysis)
The nitrogen-containing carbon material obtained in Comparative Example 7 was found to contain 80.5% by weight of carbon, 3.8% by weight of nitrogen, and 2.0% by weight of hydrogen. The number ratio of nitrogen atoms to carbon atoms (N/C) is 0.04. The number ratio of hydrogen atoms to carbon atoms (H/C) is 0.30%.

COMPARATIVE EXAMPLE 8

A fully aromatic polyimide in an amount of 12 g was filled in a quartz tube having an inner diameter of 25 mm and subjected to carbonization at 1,000° C. in the same manner as in Example 2 to obtain 6.4 g of a nitrogen-containing carbon material. The yield is 54%.
<Analysis of Nitrogen-Containing Carbon Material>
(Results of CHN Analysis)
The nitrogen-containing carbon material obtained in Comparative Example 8 was found to contain 86.1% by weight of carbon, 1.8% by weight of nitrogen, and 1.0% by weight of hydrogen. The number ratio of nitrogen atoms to carbon atoms (N/C) is 0.02. The number ratio of hydrogen atoms to carbon atoms (H/C) is 0.14%.

FIG. 15 shows the comparison of the nitrogen-containing carbon materials obtained in Examples with those obtained in Comparative Examples by plotting (H/C) on the axis of abscissas and (N/C) on the axis of ordinates.

It is apparent that the nitrogen-containing carbon material of the present invention has a high nitrogen content in spite of having a low hydrogen content.

INDUSTRIAL APPLICABILITY

The nitrogen-containing carbon material of the present invention is useful for electrode material applications such as lithium ion secondary battery negative electrodes, capacitor electrodes, and fuel cell electrodes, as a new nitrogen-containing carbon material having a high nitrogen atom content, a low hydrogen atom content, a low nitrile group content, a large interlayer spacing, and a specific laser Raman spectrum.

Moreover, the production method according to the present invention is useful as a method of producing a nitrogen-containing carbon material having a high nitrogen content and a low hydrogen content economically in production.

Specifically, the production method according to the present invention comprises a process for polymerizing a raw material containing hydrogen cyanide in a process S10 and a process (process S12) for carbonizing azulmic acid obtained in the process S10.

Hydrogen cyanide to be used in the process S110 is a direct derivative from a basic chemical raw material or a by-product during the production of a monomer or the like. Therefore, a method of producing azulmic acid from hydrogen cyanide is a method of producing a precursor of a nitrogen-containing carbon material with low consumption of energy and resources. Further, since hydrogen cyanide easily polymerizes, polymerization process is simple. Furthermore, since the resulting polymer is obtained as a non-sticky powder, it is excellent in handling properties and does not require a process of forming a powder such as a pulverization process. The present method also makes effective use of a hydrogen cyanide polymer which has not been utilized.

Moreover, the present method is a method of producing a nitrogen-containing carbon material with low consumption of energy and resources because it has a high yield of a carbon product in process S12, the carbonization process.

In the present production method, consumption of energy and resources is low both in processes S10 and S12. Therefore, the total consumption of energy and resources is very low compared with that of conventional methods.

DESCRIPTION OF SYMBOLS

Figure 1:
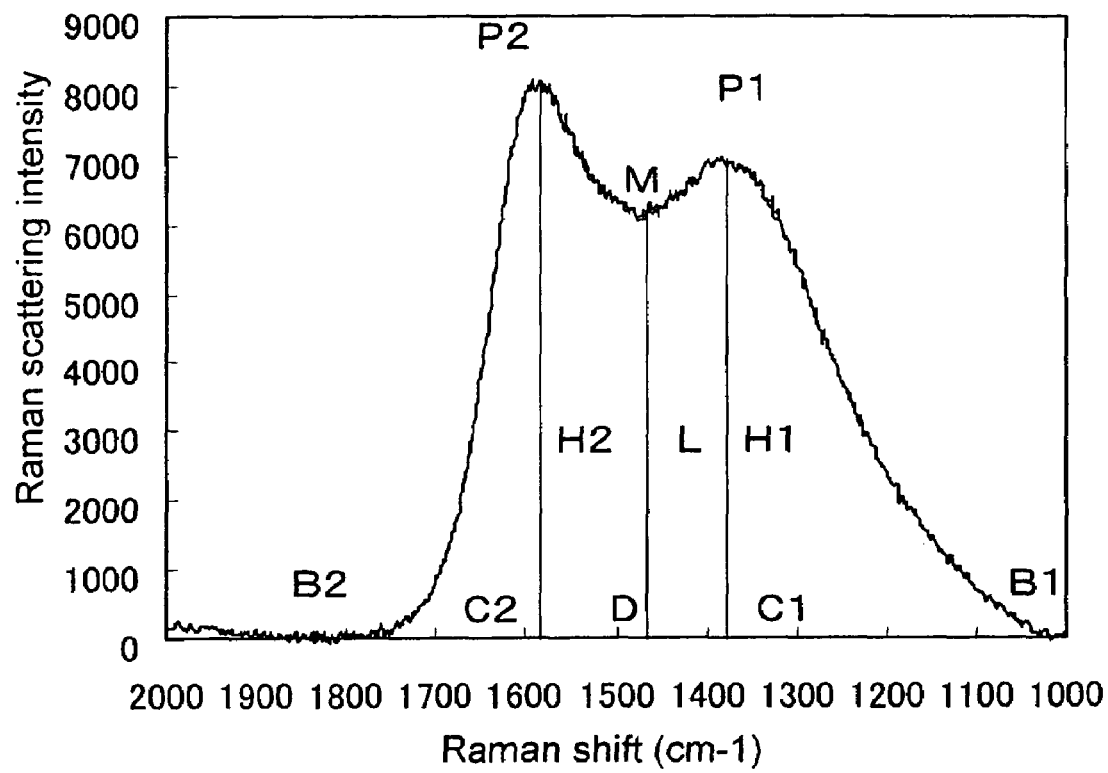
FIG. 1 shows a schematic view of an example of the laser Raman spectrum of a nitrogen-containing carbon material according to the present invention.
Figure 2:
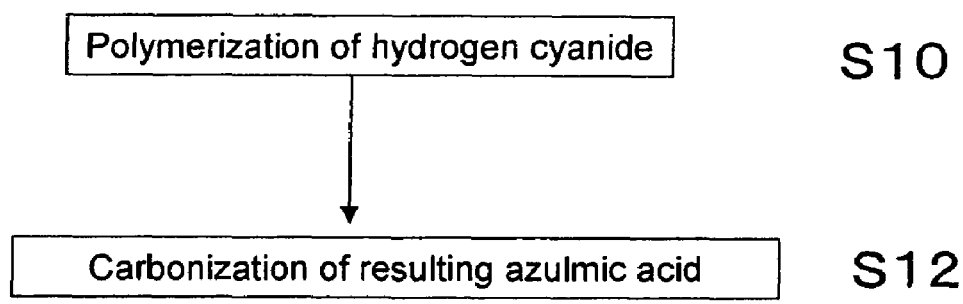
FIG. 2 shows a schematic diagram of a process for producing a nitrogen-containing carbon material according to the present invention.
Figure 3:
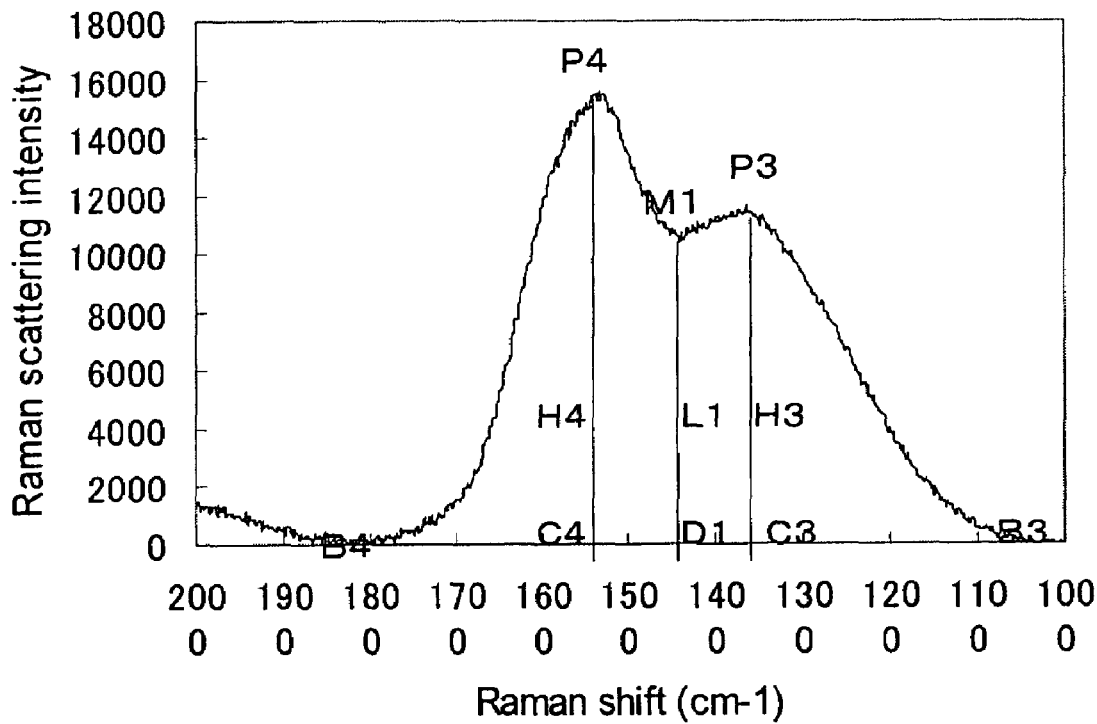
FIG. 3 shows a schematic view of an example of the laser Raman spectrum of azulmic acid used in the present invention.
Figure 4:
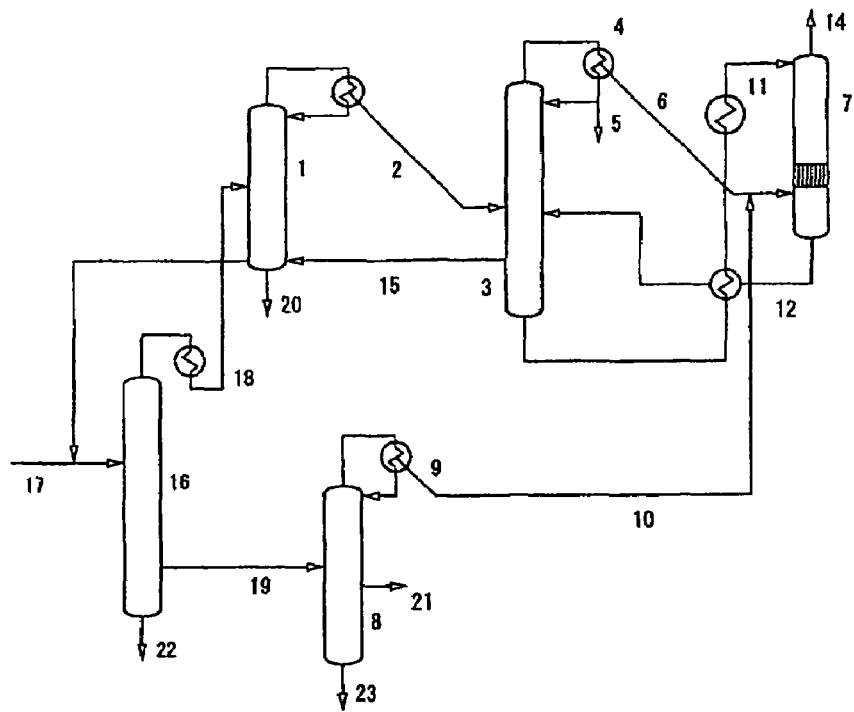
FIG. 4 is a diagram schematically illustrating a hydrogen cyanide purification process and an azulmic acid recovery process implemented by the present invention.
Figure 5:
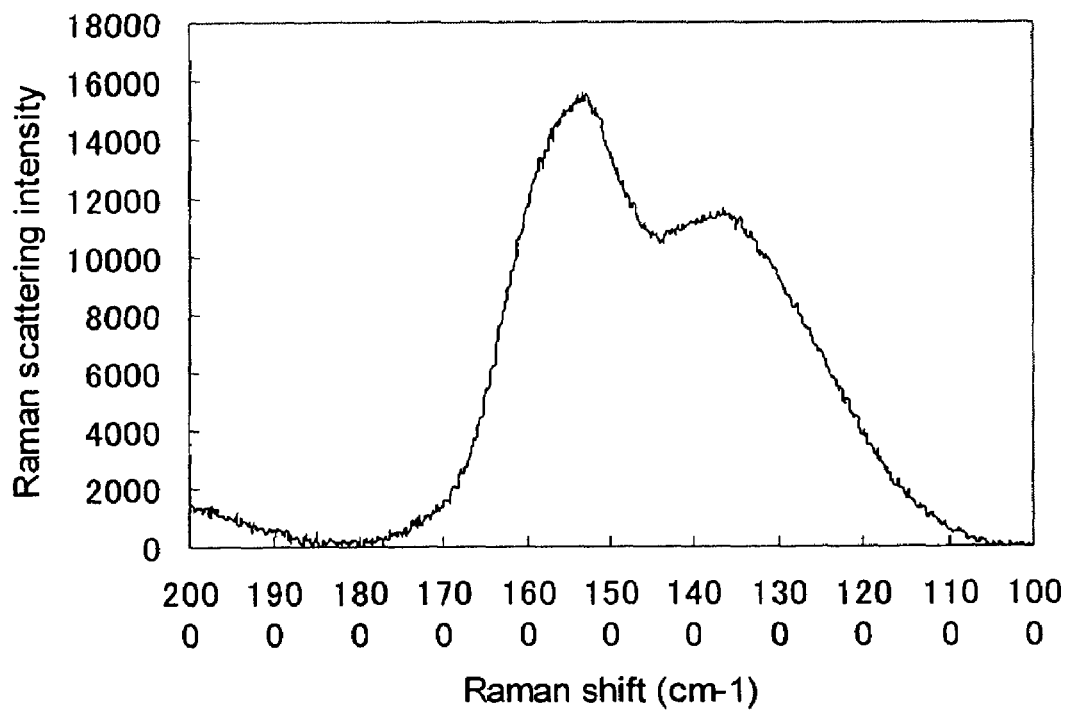
FIG. 5 shows the laser Raman spectrum of azulmic acid obtained in the production example of the present invention.
Figure 6:
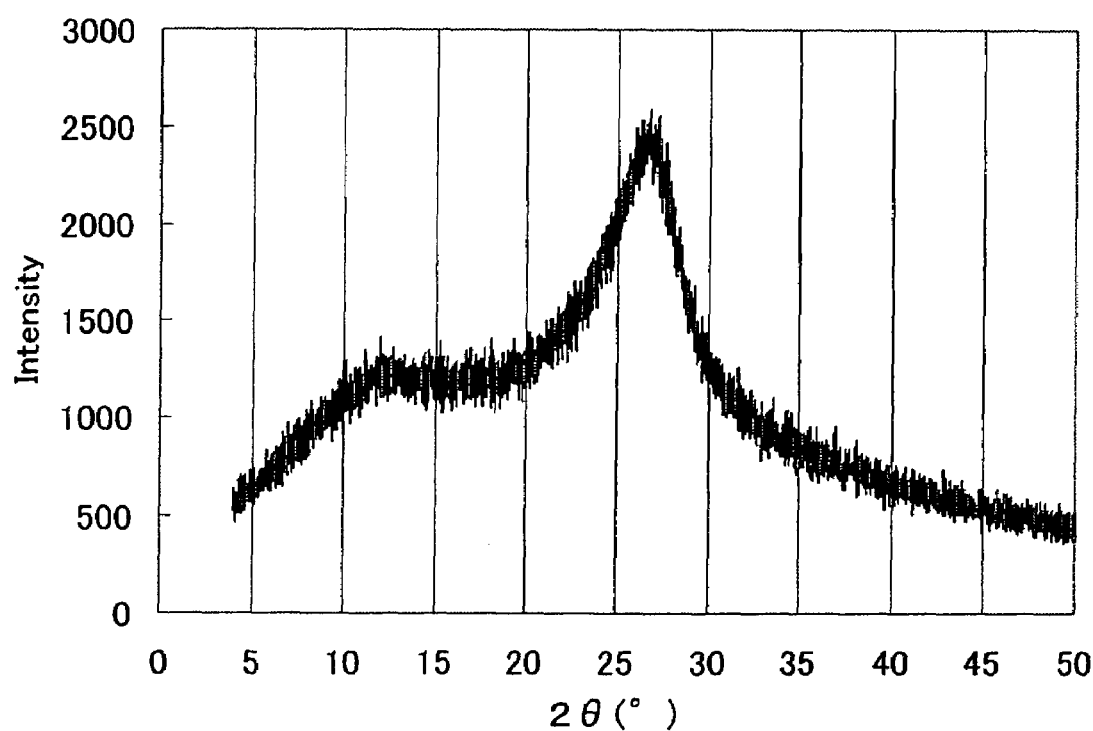
FIG. 6 shows the X-ray diffraction pattern of azulmic acid obtained in the production example of the present invention.
Figure 7:
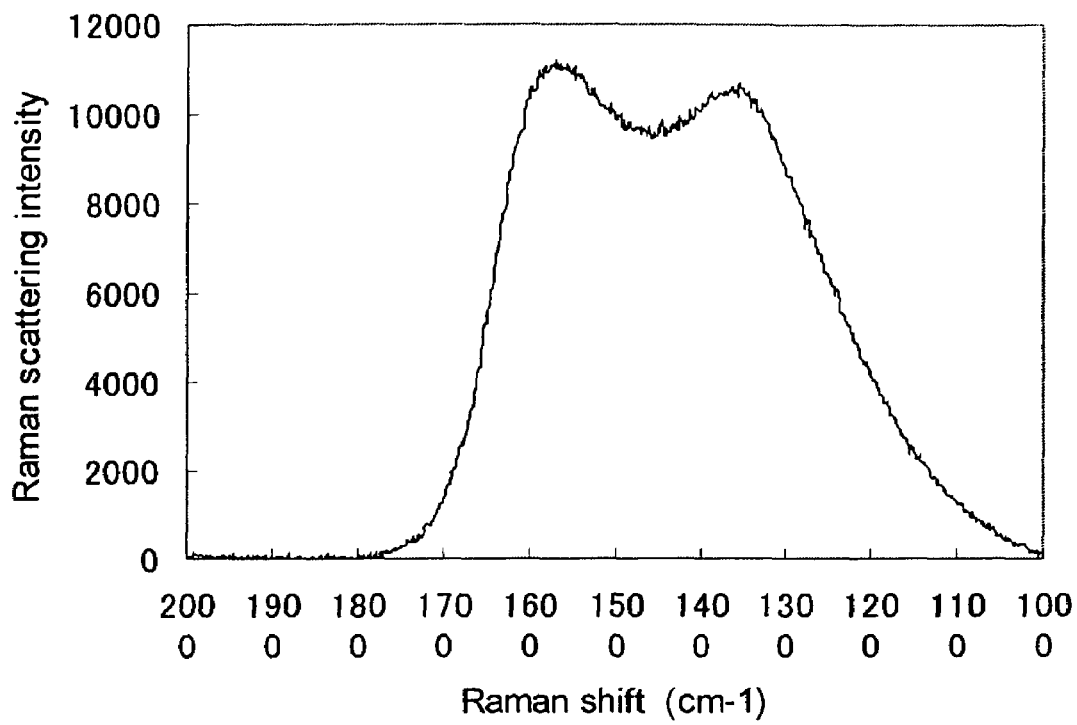
FIG. 7 shows the laser Raman spectrum of the nitrogen-containing carbon material obtained in Example 1 of the present invention.
Figure 8:
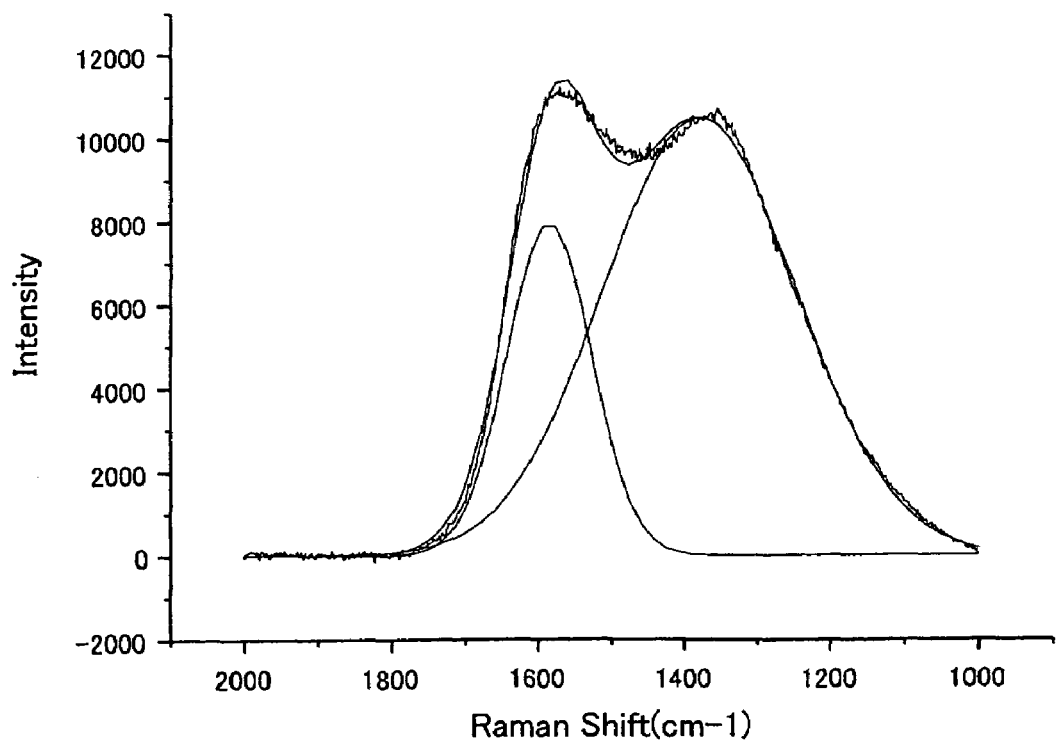
FIG. 8 shows results of a fitting by the Gaussian function of the laser Raman spectrum obtained in Example 1 of the present invention by assuming the number of peaks as two.
Figure 9:
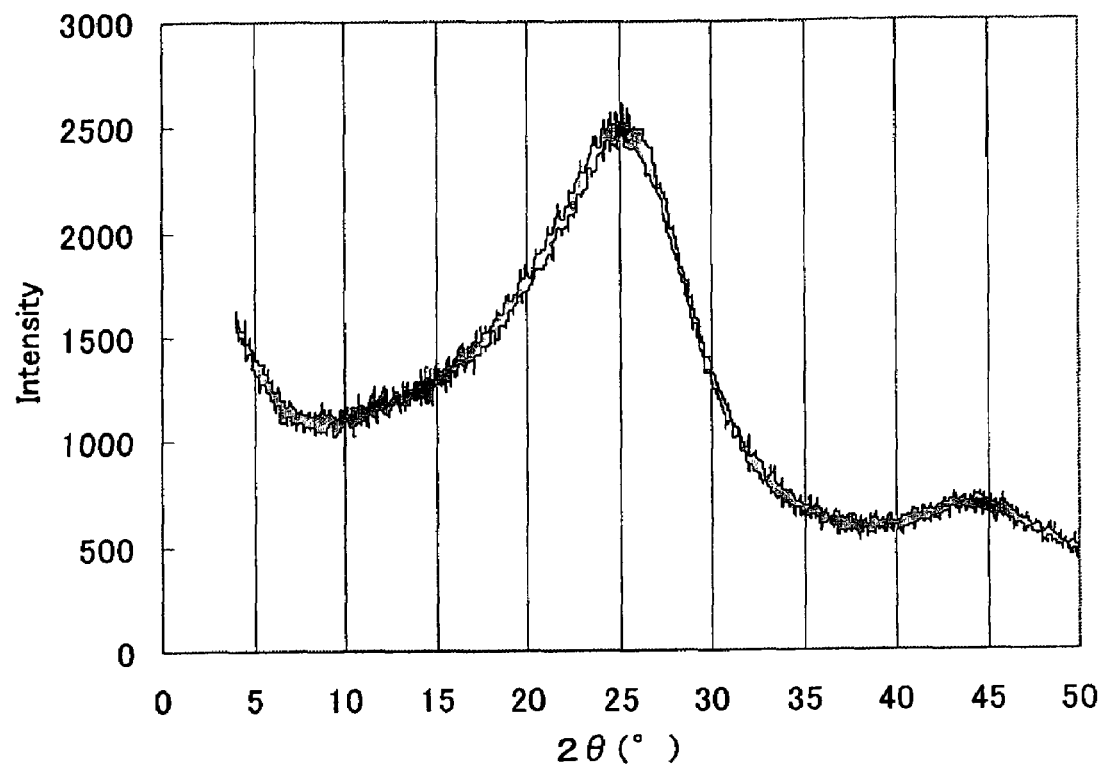
FIG. 9 shows the X-ray diffraction pattern of the nitrogen-containing carbon material obtained in Example 1 of the present invention.
Figure 10:
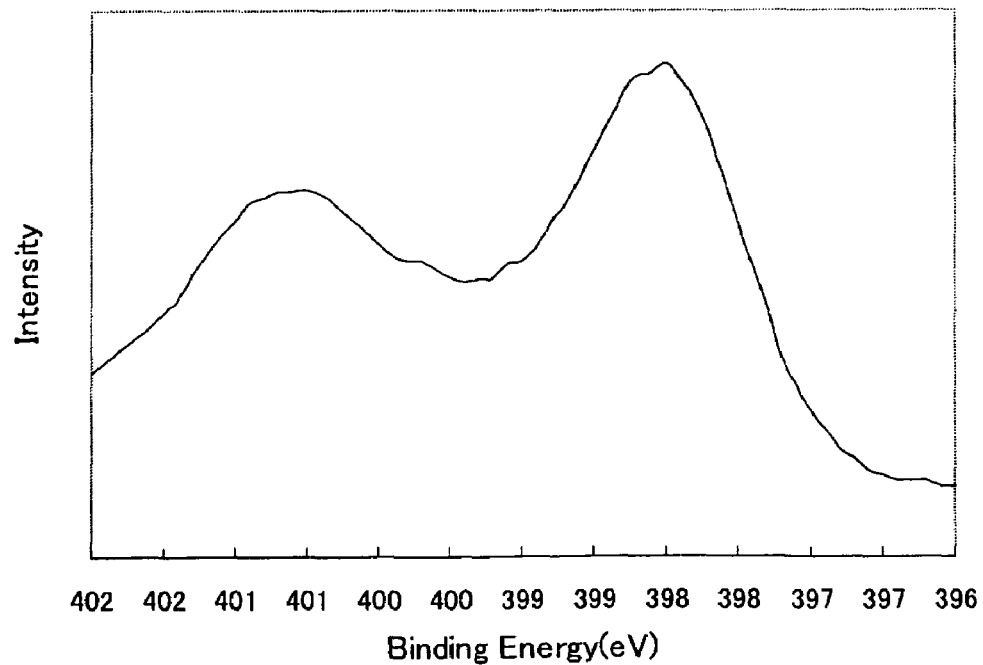
FIG. 10 shows the XPS spectrum of N1s of the nitrogen-containing carbon material obtained in Example 1 of the present invention.
Figure 11:
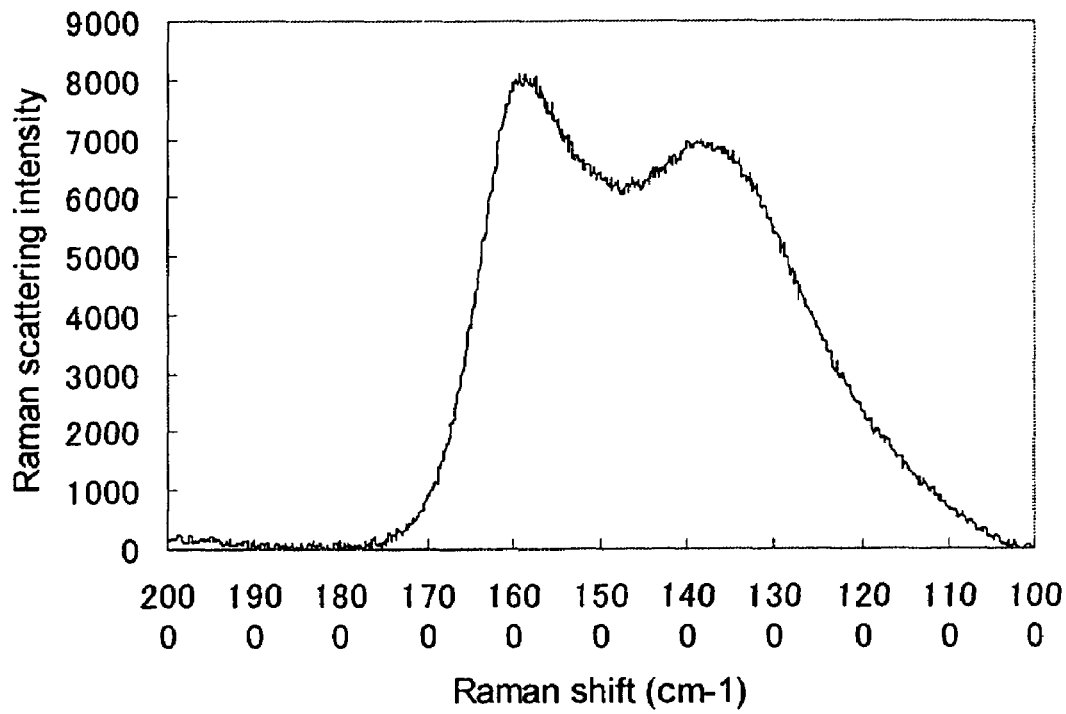
FIG. 11 shows the laser Raman spectrum of the nitrogen-containing carbon material obtained in Example 2 of the present invention.
Figure 12:
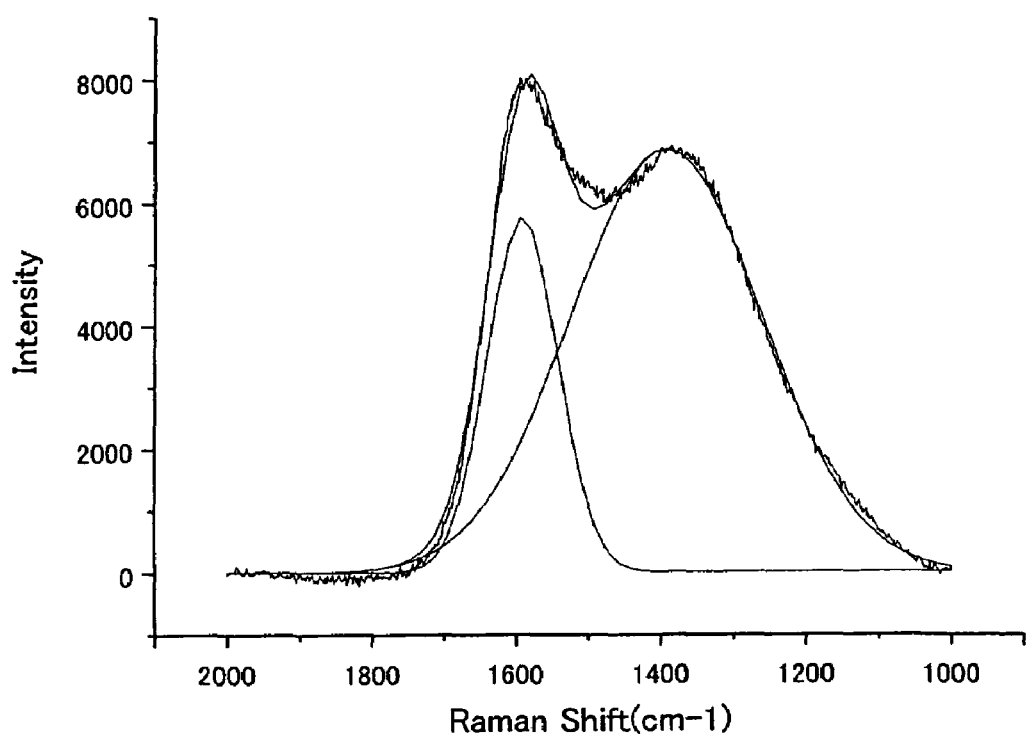
FIG. 12 shows results of a fitting by Gaussian function of the laser Raman spectrum obtained in Example 2 of the present invention by assuming the number of peaks as two.
Figure 13:
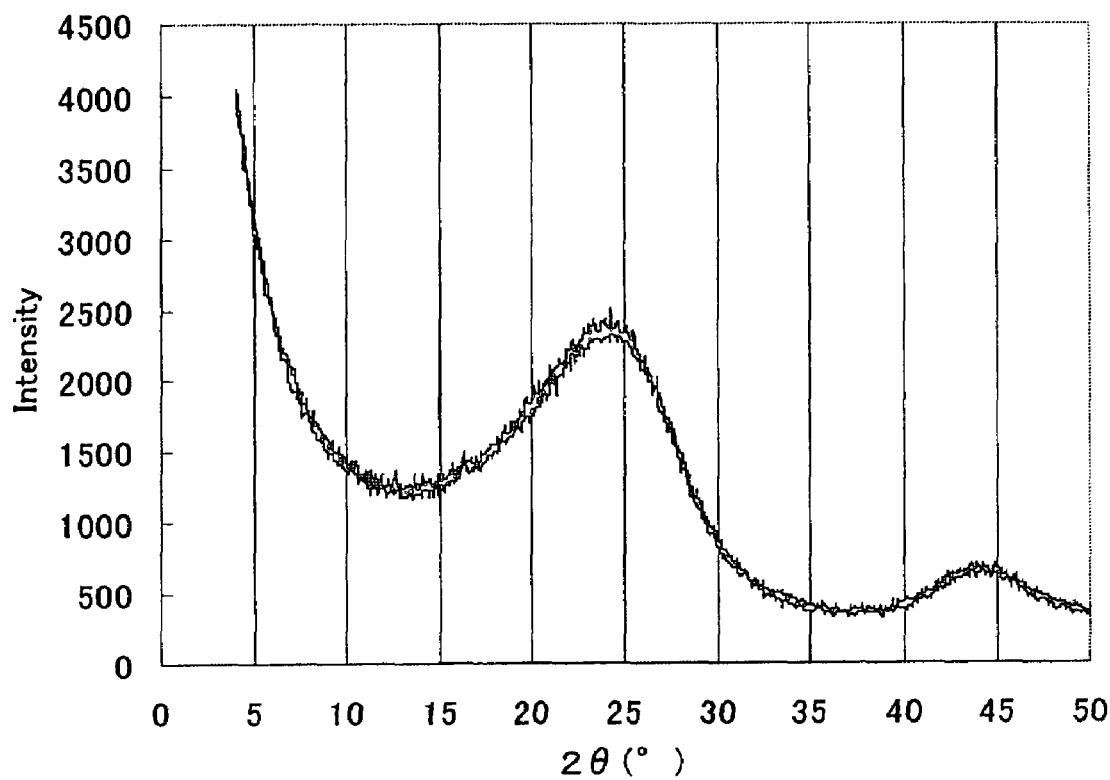
FIG. 13 shows the X-ray diffraction pattern of the nitrogen-containing carbon material obtained in Example 2 of the present invention.
Figure 14:
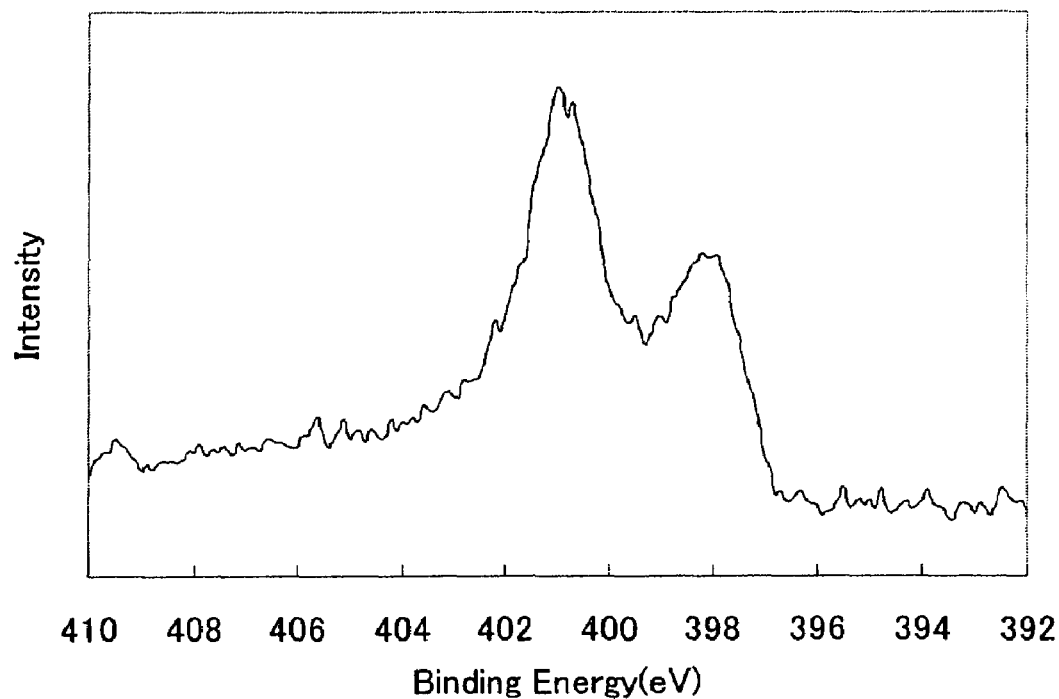
FIG. 14 shows the XPS spectrum of N1s of the nitrogen-containing carbon material obtained in Example 2 of the present invention.
Figure 15:
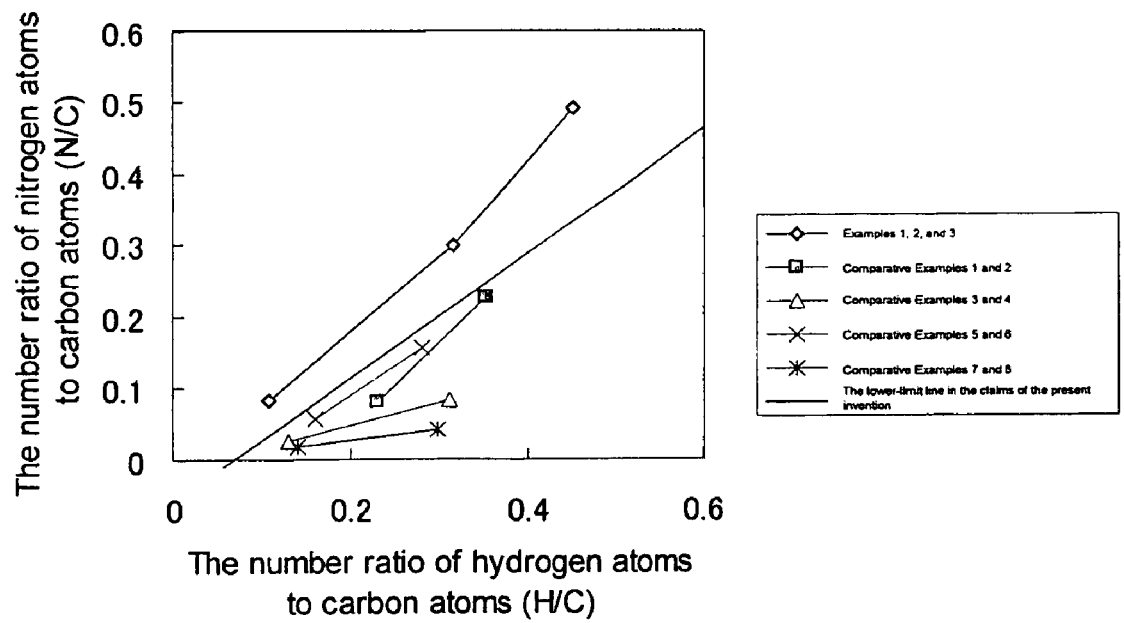
FIG. 15 shows comparison of the nitrogen-containing carbon materials obtained in Examples with those obtained in Comparative Examples by plotting (H/C) on the axis of abscissas and (N/C) on the axis of ordinates.

Description of Symbols in FIG. 4:
1. Hydrogen cyanide removal column
2. Crude hydrogen cyanide vapor
3. Hydrogen cyanide purification column
5. Purified liquified hydrogen cyanide
6. Hydrogen cyanide vapor
7. Hydrogen cyanide absorption column
8. Acetonitrile concentrating column
10. Crude hydrogen cyanide
11. Absorption liquid (inlet)
12. Absorption liquid (outlet)
14. Gas exhaust
16. Acrylonitrile recovery column

The invention claimed is:

1. A nitrogen-containing carbon material, characterized in that the material is produced by carbonizing azulmic acid in an inert gas atmosphere.

2. A method of producing a nitrogen-containing carbon material, characterized in that the material is produced by carbonizing azulmic acid in an inert gas atmosphere.

3. A nitrogen-containing carbon material, characterized in that the material satisfies the following conditions (1), (2), and (3):

(1) the material having a number ratio of nitrogen atoms to carbon atoms (N/C) and a number ratio of hydrogen atoms to carbon atoms (H/C) which satisfies the following relational expression (I):

$$(N/C) > 0.87 \times (H/C) - 0.06 \qquad (1),$$

(2) in an X-ray diffraction pattern obtained by using CuKα ray as X-ray source, the material having a peak located at an angle of diffraction (2θ) of 23.5 to 25.5°, and (3) in a laser Raman spectrum in a range of wavenumber from 1,000 to 2,000 cm$^{-1}$, the material having at least two main peaks, a peak P1 between 1,355 and 1,385 cm$^{-1}$ and a peak P2 between 1,550 and 1,620 cm$^{-1}$, wherein a height L at a minimum point M between P1 and P2 from the base line and a height H1 at P1 from the base line have a ratio (L/H1) 0.7 to 0.95.

4. The nitrogen-containing carbon material according to claim 3, characterized in that the material has peaks at 401.0±0.3 eV and 398.0±0.5 eV in an XPS spectrum of N1s as measured by X-ray photoelectron spectroscopy (XPS).

5. The nitrogen-containing carbon material according to claim 4, characterized in that, in the laser Raman spectrum in a range of wavenumber from 1,000 to 2,000 cm$^{-1}$, the peak P1 has a half-width of 200 to 400 cm$^{-1}$.

6. The nitrogen-containing carbon material according to claim 5, characterized in that, in the laser Raman spectrum in a range of wavenumber from 1,000 to 2,000 cm$^{-1}$, the peak P2 has a half-width of 30 to 200 cm$^{-1}$.

7. The nitrogen-containing carbon material according to claim 6, characterized in that the number ratio of hydrogen atoms to carbon atoms (H/C) is 0.01 to 0.5.

8. The nitrogen-containing carbon material according to any of claim 7, characterized in that, in an infrared absorption spectrum, the maximum of peak intensities of absorbance in a wavenumber range of 1,500 to 1,800 cm$^{-1}$ has a wavenumber from 1,550 to 1,640 cm$^{-1}$.

9. The nitrogen-containing carbon material according to claim 8, characterized in that, in the infrared absorption spectrum, an intensity Q2 at a peak S2 of absorbance at a wavenumber of 2,200 to 2,280 cm$^{-1}$ and an intensity Q1 at a peak S1 of absorbance at a wavenumber of 1,550 to 1,640 cm$^{-1}$ have a ratio (Q2/Q1) of 0.07 or less.

10. The nitrogen-containing carbon material according to claim 9, characterized in that, in the infrared absorption spectrum, an intensity Q3 at a peak S3 of absorbance at a wavenumber of 2,800 to 3,000 cm$^{-1}$ and the intensity Q1 at the peak S1 of absorbance at a wavenumber of 1,550 to 1,640 cm$^{-1}$ have a ratio (Q3/Q1) of 0.10 or less.

11. The nitrogen-containing carbon material according to claim 10, characterized in that, in the infrared absorption spectrum, an intensity Q4 at a peak S4 of absorbance at a wavenumber of 3,000 to 3,500 cm$^{-1}$ and the intensity Q1 at the peak S1 of absorbance at a wavenumber of 1,550 to 1,640 cm$^{-1}$ have a ratio (Q4/Q1) of 0.80 or less.

12. The nitrogen-containing carbon material according to claim 1, characterized in that the material satisfies the following conditions (1), (2), and (3):
(1) the material having a number ratio of nitrogen atoms to carbon atoms (N/C) and a number ratio of hydrogen atoms to carbon atoms (H/C) which satisfies the following relational expression (I):

$$(N/C) > 0.87 \times (H/C) - 0.06 \quad (I).$$

(2) in an X-ray diffraction pattern obtained by using CuKα ray as X-ray source, the material having a peak located at an angle of diffraction (2θ) of 23.5 to 25.5°, and
(3) in a laser Raman spectrum in a range of wavenumber from 1,000 to 2,000 cm$^{-1}$, the material having at least two main peaks, a peak P1 between 1,355 and 1,385 cm$^{-1}$ and a peak P2 between 1,550 and 1,620 cm$^{-1}$, wherein a height L at a minimum point M between P1 and P2 from the base line and a height H1 at P1 from the base line have a ratio (L/H1) 0.7 to 0.95.

13. The nitrogen-containing carbon material according to claim 1, characterized in that the material has peaks at 401.0±0.3 eV and 398.0±0.5 eV in an XPS spectrum of N1s as measured by X-ray photoelectron spectroscopy (XPS).

14. The nitrogen-containing carbon material according to claim 1, characterized in that, in the laser Raman spectrum in a range of wavenumber from 1,000 to 2,000 cm$^{-1}$, the peak P1 has a half-width of 200 to 400 cm$^{-1}$.

15. The nitrogen-containing carbon material according to claim 1, characterized in that in the laser Raman spectrum in a range of wavenumber from 1,000 to 2,000 cm$^{-1}$, the peak P2 has a half-width of 30 to 200 cm$^{-1}$.

16. The nitrogen-containing carbon material according to claim 1, characterized in that the number ratio of hydrogen atoms to carbon atoms (H/C) is 0.01 to 0.5.

17. The nitrogen-containing carbon material according to claim 1, characterized in that in an infrared absorption spectrum, the maximum of peak intensities of absorbance in a wavenumber range of 1,500 to 1,800 cm$^{-1}$ has a wavenumber from 1,550 to 1,640 cm$^{-1}$.

18. The nitrogen-containing carbon material according to claim 1, characterized in that in the infrared absorption spectrum, an intensity Q2 at a peak S2 of absorbance at a wavenumber of 2,200 to 2,280 cm$^{-1}$ and an intensity Q1 at a peak S1 of absorbance at a wavenumber of 1,550 to 1,640 cm$^{-1}$ have a ratio (Q2/Q1) of 0.07 or less.

19. The nitrogen-containing carbon material according to claim 1, characterized in that in the infrared absorption spectrum, an intensity Q3 at a peak S3 of absorbance at a wavenumber of 2,800 to 3,000 cm$^{-1}$ and the intensity Q1 at the peak S1 of absorbance at a wavenumber of 1,550 to 1,640 cm$^{-1}$ have a ratio (Q3/Q1) of 0.10 or less.

20. The nitrogen-containing carbon material according to claim 1, characterized in that in the infrared absorption spectrum, an intensity Q4 at a peak S4 of absorbance at a wavenumber of 3,000 to 3,500 cm$^{-1}$ and the intensity Q1 at the peak S1 of absorbance at a wavenumber of 1,550 to 1,640 cm$^{-1}$ have a ratio (Q4/Q1) of 0.80 or less.

21. The nitrogen-containing carbon material for electrode materials according to claim 1.

22. The nitrogen-containing carbon material for electrode materials according to claim 3.

23. The nitrogen-containing carbon material for electrode materials according to claim 4.

24. The nitrogen-containing carbon material for electrode materials according to claim 5.

25. The nitrogen-containing carbon material for electrode materials according to claim 6.

26. The nitrogen-containing carbon material for electrode materials according to claim 7.

27. The nitrogen-containing carbon material for electrode materials according to claim 8.

28. The nitrogen-containing carbon material for electrode materials according to claim 9.

29. The nitrogen-containing carbon material for electrode materials according to claim 10.

30. The nitrogen-containing carbon material for electrode materials according to claim 11.

31. The nitrogen-containing carbon material for electrode materials according to claim 12.

* * * * *